(12) United States Patent
Hashikawa

(10) Patent No.: US 10,935,854 B2
(45) Date of Patent: Mar. 2, 2021

(54) OPTICAL DEVICE

(71) Applicant: PIONEER CORPORATION, Tokyo (JP)

(72) Inventor: Hirokazu Hashikawa, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 16/476,819

(22) PCT Filed: Jan. 18, 2018

(86) PCT No.: PCT/JP2018/001353
§ 371 (c)(1),
(2) Date: Jul. 9, 2019

(87) PCT Pub. No.: WO2018/135571
PCT Pub. Date: Jul. 26, 2018

(65) Prior Publication Data
US 2019/0361283 A1 Nov. 28, 2019

(30) Foreign Application Priority Data
Jan. 18, 2017 (JP) .............................. JP2017-006809

(51) Int. Cl.
*G02F 1/1347* (2006.01)
*G02F 1/1335* (2006.01)
(Continued)

(52) U.S. Cl.
CPC .......... *G02F 1/13471* (2013.01); *G02F 1/137* (2013.01); *G02F 1/1337* (2013.01); *G02F 1/133528* (2013.01)

(58) Field of Classification Search
None
See application file for complete search history.

(56) References Cited

U.S. PATENT DOCUMENTS 4,278,327 A 7/1981 McMahon et al.
4,385,799 A 5/1983 Soref
(Continued)

FOREIGN PATENT DOCUMENTS

| JP | S56-128918 A | 10/1981 |
| JP | S57-14122 U | 1/1982 |
| JP | 59-7337 A | 1/1984 |

OTHER PUBLICATIONS

International Search Report for related International Application No. PCT/JP2018/001353, dated Apr. 10, 2018; 5 pages (with English translation).

*Primary Examiner* — Ryan Crockett
(74) *Attorney, Agent, or Firm* — Procopio, Cory, Hargreaves & Savitch LLP

(57) ABSTRACT

An optical device comprising first and second optical elements. The first optical element has: a first liquid crystal element; a first transmissive member formed on the first liquid crystal element and having a light incident surface on which external incident light is incident and a first light-outputting surface through which light reflected by the first liquid crystal element is outputted; and a second transmissive member having a second light-outputting surface through which transmitted light having been transmitted through the first liquid crystal element is outputted. The second optical element has: a second liquid crystal element; and a third transmissive member formed on the second liquid crystal element and joined to the first light-outputting surface.

6 Claims, 19 Drawing Sheets

(51) Int. Cl.
G02F 1/1337 (2006.01)
G02F 1/137 (2006.01)

(56) References Cited

U.S. PATENT DOCUMENTS

| | | |
|---|---|---|
| 5,018,835 A | 5/1991 | Dorschner |
| 2011/0181949 A1* | 7/2011 | Hashikawa .......... G02B 17/006 359/463 |
| 2013/0169920 A1* | 7/2013 | Wada .................... C03B 23/037 349/200 |
| 2017/0007182 A1* | 1/2017 | Samec ................... A61B 3/022 |

* cited by examiner (a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

OPTICAL DEVICE

CROSS-REFERENCE TO RELATED APPLICATIONS

This application is a U.S. National Stage entry of PCT Application No: PCT/JP2018/001353 filed Jan. 18, 2018, which claims priority to Japanese Patent Application No. 2017-006809, filed Jan. 18, 2017, the contents of which are incorporated herein by reference.

TECHNICAL FIELD

The present invention relates to an optical device composed of an optical element including a liquid crystal layer.

BACKGROUND ART

Conventionally, optical devices such as liquid crystal panels, liquid crystal shutters, and optical path switching devices using liquid crystal elements have become widespread. For example, Patent Literature 1 discloses an optical control device that has a liquid crystal cell in which liquid crystal is interposed and held between a pair of electrode substrates, an orientation film for controlling the alignment of the liquid crystal by application of a voltage, and a polarizing plate.

CITATION LIST

Patent Literature

Patent Literature 1: Japanese Patent Application Laid-Open No. Sho. 59-7337

SUMMARY OF INVENTION

Technical Problem

For example, an optical device constitutes a light source system together with a light source. An optical device using liquid crystal is driven such that the state of orientation of liquid crystal molecules in a liquid crystal element is adjusted by application of a voltage, and the light transmission conditions of the liquid crystal element, with respect to an input light ray from a light source, are thereby adjusted. The amount of light extracted from the optical device is thereby adjusted, and various optical processes, such as luminance control and the switching of an optical path, are carried out.

Such an optical device preferably has a low light loss in the device, in other words, enables the extraction of light with high efficiency. The optical device also preferably has high driving responsiveness.

The present invention has been made in view of the circumstances as described above, and an object of the present invention is to provide an optical device that has high driving responsiveness, and enables the extraction of light with high efficiency.

Solution to Problem

An invention described in claim 1 includes first and second optical elements. The first optical element has: a first liquid crystal element; a first transmissive member formed on the first liquid crystal element and having a light incident surface on which external incident light is incident and a first light-outputting surface through which light reflected by the first liquid crystal element is outputted; and a second transmissive member having a second light-outputting surface through which transmitted light having been transmitted through the first liquid crystal element is outputted. The second optical element has: a second liquid crystal element; and a third transmissive member formed on the second liquid crystal element and joined to the first light-outputting surface.

DESCRIPTION OF EMBODIMENTS

Embodiments of the present invention will be described in detail below.

First Embodiment

Figure 1:
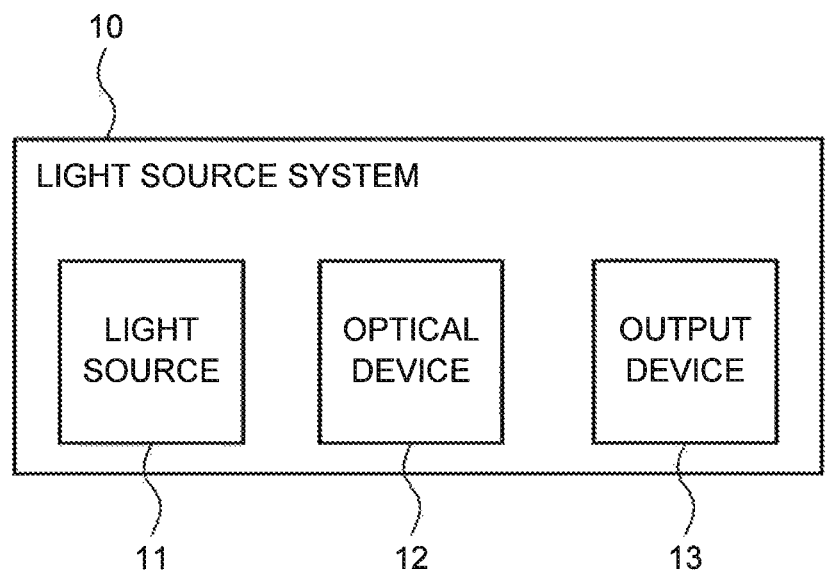
FIG. 1(a) is a block diagram showing a light source system including an optical device according to a first embodiment.
FIG. 1(b) is a perspective view of the optical device according to the first embodiment.
Figure 1:
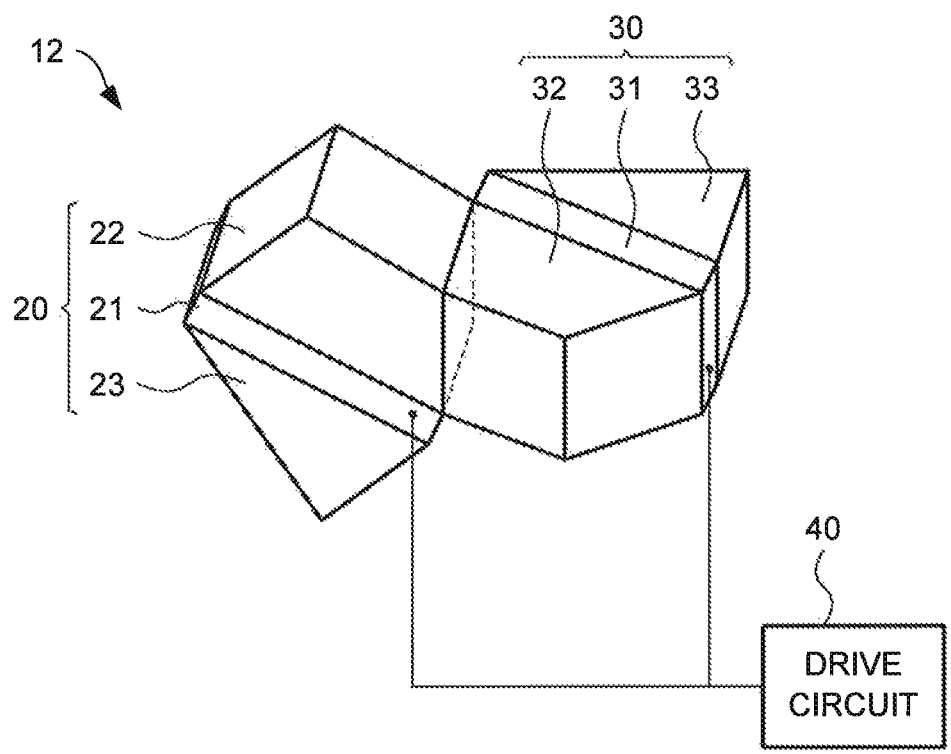

FIG. 1(a) is a block diagram showing a configuration of a light source system 10 according to a first embodiment. The light source system 10 is composed of a light source 11, an optical device 12 for optically processing light rays from the light source 11, and an output device 13 for outputting light rays processed by the optical device 12. For example, the light source 11 includes a light-emitting device such as a light-emitting diode or a semiconductor laser. The output device 13 includes, for example, reflecting mirrors that reflect the light rays from the optical device 12 to output destinations, and the like.

FIG. 1(b) is a schematic perspective view of the optical device 12. The optical device 12 includes two optical elements (first and second optical elements) 20 and 30, and a drive circuit 40 for driving the optical elements 20 and 30.

The first optical element 20 includes a layered liquid crystal element (first liquid crystal element) 21 containing liquid crystal molecules, and transmissive members (first and second transmissive members) 22 and 23 disposed so as to sandwich the liquid crystal element 21. The optical element 30 includes a layered liquid crystal element (second liquid crystal element) 31 containing liquid crystal molecules, and transmissive members (third and fourth transmissive members) 32 and 33 disposed so as to sandwich the liquid crystal element 31.

In the present embodiment, the optical elements 20 and 30 are optically bonded to each other by joining the transmissive member 22 of the optical element 20 and the transmissive member 32 of the optical element 30 together. The drive circuit 40 drives the liquid crystal elements 21 and 31.

Figure 2:
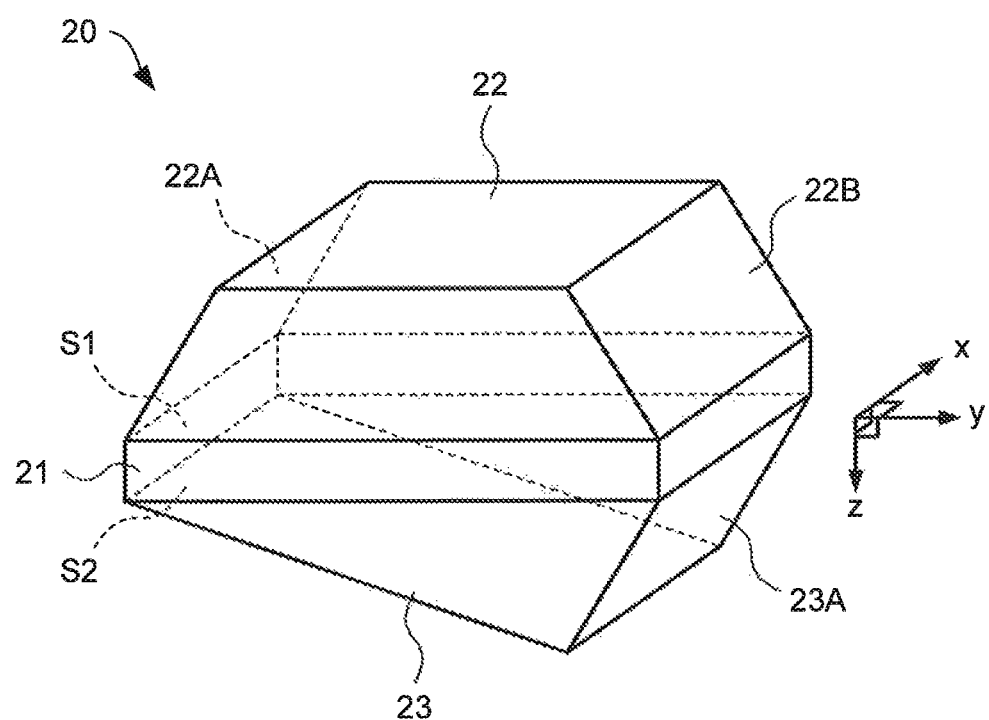
FIG. 2 is a perspective view of an optical element in the optical device according to the first embodiment.

FIG. 2 is a schematic perspective view of the optical element 20. The liquid crystal element 21 has two main surfaces (first and second main surfaces) S1 and S2 opposite to each other. In the present embodiment, the main surface S1 functions as a surface upon which the light ray from the light source 11 is incident. The main surface S2 functions as a surface through which the light ray having been transmitted through the main surface S1 is outputted from the liquid crystal element 21. In the following description, the main surface S1 is referred to as an incident liquid crystal surface (first liquid crystal surface), and the main surface S2 is referred to as an outputting liquid crystal surface (second liquid crystal surface). In other words, the liquid crystal element 21 has the incident liquid crystal surface S1 and the outputting liquid crystal surface S2, which is opposite to the incident liquid crystal surface S1.

The transmissive member 22 is formed on the incident liquid crystal surface S1 of the liquid crystal element 21. The transmissive member 22 has transparency to the light rays from the light source 11. The transmissive member 22 is a transparent medium made of, for example, a glass material or a resin material. In the present embodiment, the transmissive member 22 has the shape of a prism having a trapezoidal cross-section. The transmissive member 22 is formed such that its side surface corresponding to the bottom sides of the trapezoids of the prism is formed on the incident liquid crystal surface S1 of the liquid crystal element 21.

The light rays from the light source 11 are incident upon the liquid crystal element 21 through the transmissive member 22. The transmissive member 22 has a light incident surface 22A upon which the light rays from the light source 11 are incident. The light incident surface 22A is inclined with respect to the incident liquid crystal surface S1. In the present embodiment, the angle formed between the incident liquid crystal surface S1 and the light incident surface 22A is approximately 70°.

In the present embodiment, at least a part of the light rays incident upon the light incident surface 22A is reflected by the incident liquid crystal surface S1, and outputted from the transmissive member 22. The transmissive member 22 has a light-outputting surface (first light-outputting surface) 22B from which the reflected light ray from the incident liquid crystal surface S1 is outputted. In the present embodiment, in the transmissive member 22, one of two side surfaces corresponding to legs of the trapezoids of the prism functions as the light incident surface 22A, and the other functions as the light-outputting surface 22B.

The transmissive member 23 is formed on the outputting liquid crystal surface S2 of the liquid crystal element 21. The transmissive member 23 has transparency to the light rays from the light source 11. The transmissive member 23 is a transparent medium made of, for example, a glass material or a resin material. In the present embodiment, the transmissive member 23 has the shape of a prism having a triangular cross-section. The transmissive member 22 is formed such that its side surface corresponding to the longest sides of the triangles of the triangular prism is formed on the outputting liquid crystal surface S1 of the liquid crystal element 21.

Light rays having been transmitted through the incident liquid crystal surface S1 of the liquid crystal element 21 and outputted from the outputting liquid crystal surface S2 thereof are outputted through the transmissive member 23. The transmissive member 23 has a light-outputting surface (second light-outputting surface) 23A from which the light rays having been transmitted through the liquid crystal element 21 are outputted. Note that the light incident surface 22A of the transmissive member 22 and the light-outputting surface 23A of the transmissive member 23 are disposed in parallel with each other. For example, the transmissive members 22 and 23 have an optical refractive index of 1.76.

Note that, in the present embodiment, the liquid crystal element 21 has the shape of a flat plate as a whole, and has a rectangular top surface. The incident liquid crystal surface S1 and the outputting liquid crystal surface S2 of the liquid crystal element 21 are formed in parallel with each other.

In the following description, a direction along the light incident surface 22A of the transmissive member 23, in the incident liquid crystal surface S1 of the liquid crystal element 21, is referred to as an x-axis direction (the width direction of the liquid crystal element 21). The direction perpendicular to the x-axis direction in the incident liquid crystal surface S1 of the liquid crystal element 21, that is, in the present embodiment, a direction directing from the light incident surface 22A of the transmissive member 22 to the light-outputting surface 22B thereof is referred to as a y-axis direction (the length direction of the liquid crystal element 21). A direction orthogonal to both the x-axis direction and the y-axis direction is referred to as a z-axis direction (the depth direction or the thickness direction of the liquid crystal element 21).

Note that, in the present embodiment, the optical element 21 is configured and disposed such that the incident light rays from the light source 11 are composed only of components in the y-axis and z-axis directions. In other words, the main components (main optical axis) of the light rays incident upon the optical element 21 do not have a component in the x-axis direction, but have the components perpendicular to the x-axis direction.

Figure 3:
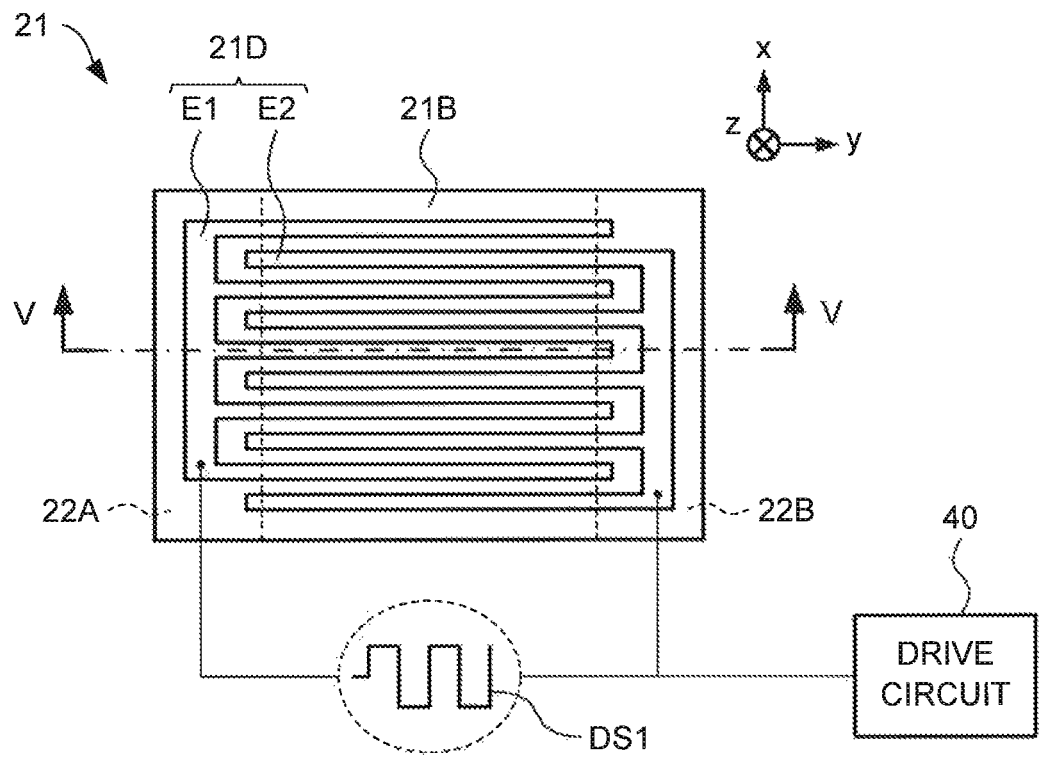
FIGS. 3(a) and 3(b) are a schematic top view and cross-sectional view of the liquid crystal element in the optical element according to the first embodiment, respectively.
Figure 3:
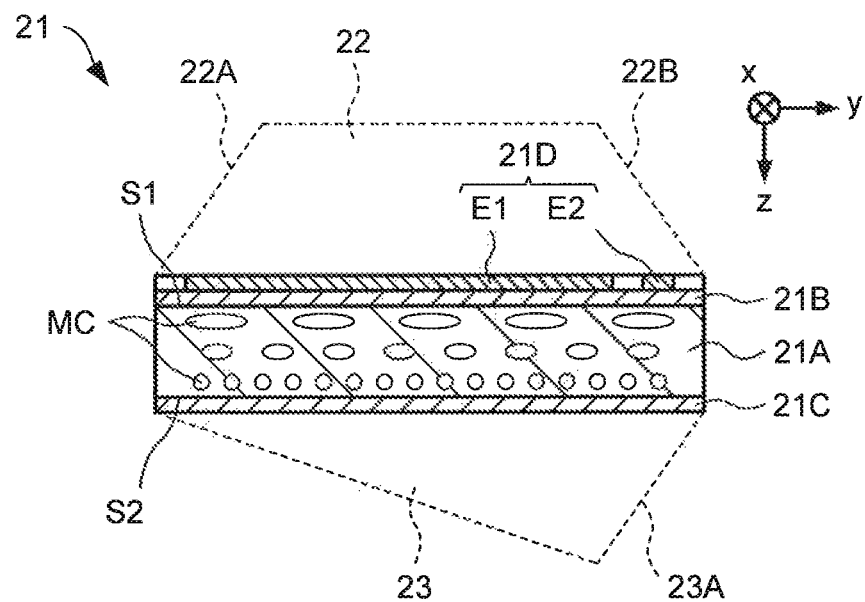

FIG. 3(*a*) is a schematic top view of the liquid crystal element 21. FIG. 3(*a*) is a view schematically showing the incident liquid crystal surface S1 of the liquid crystal element 21. FIG. 3(*b*) is a schematic cross-sectional view of the liquid crystal element 21. FIG. 3(*b*) is a cross-sectional view taken along line V-V of FIG. 3(*a*). The configuration of the liquid crystal element 21 will be described with reference to FIGS. 3(*a*) and 3(*b*).

The liquid crystal element 21 includes a liquid crystal layer 21A containing liquid crystal molecules MC, orientation films (first and second orientation films) 21B and 21C formed opposite to each other so as to sandwich the liquid crystal layer 21A, and drive electrodes (first drive electrodes) 21D formed on the orientation film 21B.

Note that, in the present embodiment, the incident liquid crystal surface S1 of the liquid crystal element 21 is a surface of the liquid crystal layer 21A on the side of the transmissive member 22, and the outputting liquid crystal surface S2 is a surface of the liquid crystal layer 21A on the side of the transmissive member 23. In the present embodiment, the transmissive member 22 is formed on the orientation film 21B (in the present embodiment, on the drive electrodes 21D) on the side of the incident liquid crystal surface S1. The transmissive member 23 is formed on the orientation film 21C on the side of the outputting liquid crystal surface S2.

The liquid crystal layer 21A contains, for example, rod-shaped nematic liquid crystal, as the liquid crystal molecules MC. The orientation films 21B and 21C are made of, for example, film-shaped polyimide to which an orientation process has been applied. The orientation films 21B and 21C have transparency to the light rays from the light source 11. The liquid crystal molecules MC in the liquid crystal layer 21A are subjected to rubbing by the orientation films 21B and 21C. For example, the liquid crystal layer 21A has an optical refractive index of 1.52, in a not-driven state, in other words, in a state that an electric field is not applied from the drive electrodes 21D.

In the present embodiment, in the not-driven state, the liquid crystal molecules MC are subjected to rubbing so as to have twisted orientation in which long-axis direction (long-axis direction of molecules of the nematic liquid crystal) on the side of the incident liquid crystal surface S1 (on the side of the orientation film 21B) is orthogonal to that on the side of the outputting liquid crystal surface S2. More specifically, for example, the long-axis direction of the liquid crystal molecules MC is oriented along the y-axis direction (first direction) on the side of the incident liquid crystal surface S1, while the long-axis direction of the liquid crystal molecules MC is oriented along the x-axis direction (second direction) on the side of the outputting liquid crystal surface S2.

The drive electrodes 21D have transparency to the light ray from the light source 11. The drive electrodes 21D are composed of a pair of electrodes (first and second electrodes) E1 and E2 in stripes that extend on the orientation film 21B in the y-axis direction, that is, along the incident direction of the light rays from the light source 11. In the present embodiment, the electrodes E1 and E2 are made of transparent conductive oxide films such as ITO or IZO.

In the present embodiment, the electrodes E1 and E2 are formed in the shape of combs on the orientation film 21B such that the stripes thereof are staggered with respect to each other. To be more specific, the electrode E1 has stripes (comb teeth) extending from the light incident surface 22A toward the light-outputting surface 22B on the orientation film 21B. The electrode E2 has stripes (comb teeth) extending from the light-outputting surface 22B toward the light incident surface 22A on the orientation film 21B.

In the present embodiment, the drive circuit 40 applies an alternating voltage, as a drive signal DS1, between the electrodes E1 and E2. An electric field is thereby generated along the x-axis direction in the vicinity of the incident liquid crystal surface S1 of the liquid crystal layer 21A.

Figure 4:
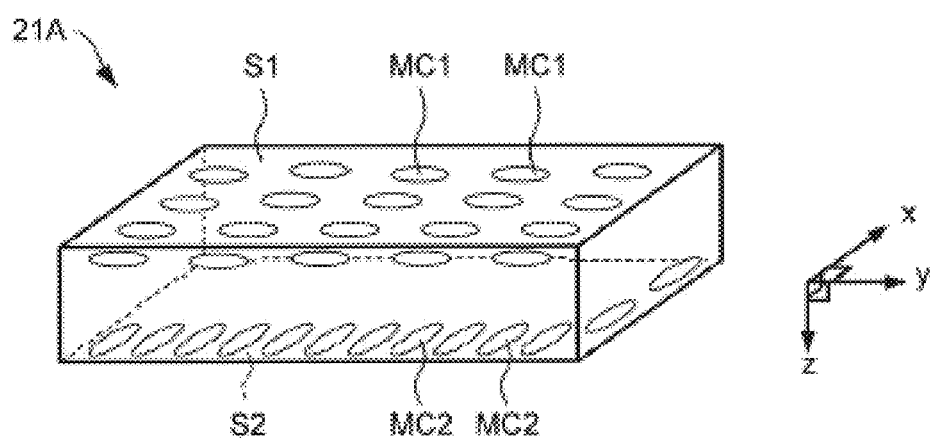
FIG. 4(a) is a view schematically showing an alignment state of liquid crystal molecules in the liquid crystal element of the optical element according to the first embodiment.
FIG. 4(b) is a path of a light ray in the optical element according to the first embodiment.
Figure 4:
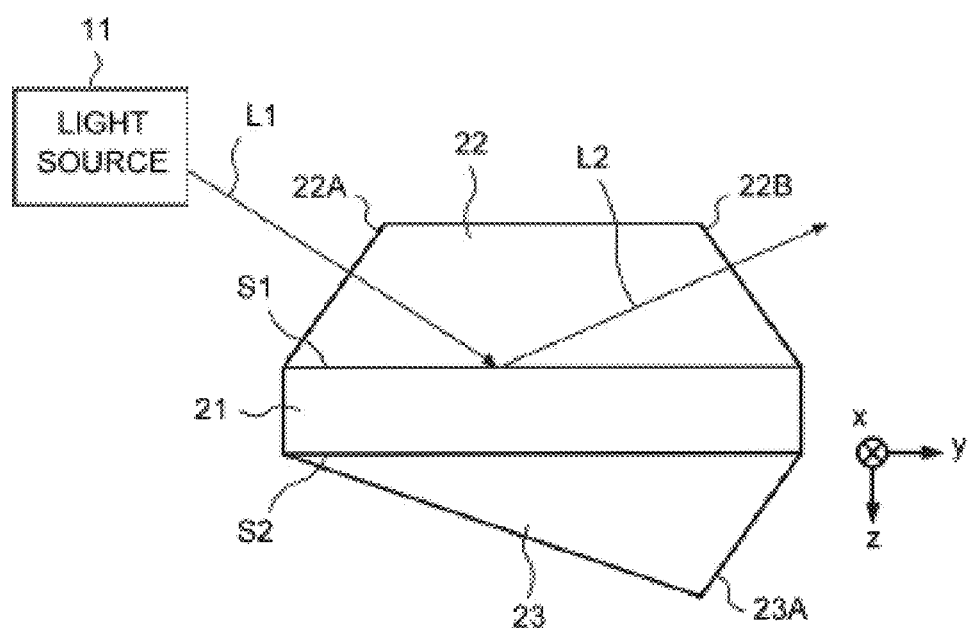

FIG. 4(*a*) is a view schematically showing the state of orientation of the liquid crystal molecules MC in the liquid crystal layer 21A in a not-driven state, that is, in a state where the drive signal DS1 is not supplied to the drive electrodes 21D. FIG. 4(*b*) is a view schematically showing the path of light rays in the optical element 20 in a not-driven state.

In the not-driven state, a voltage is not applied to the liquid crystal layer 21A. Therefore, as shown in FIG. 4(*a*), the liquid crystal molecules MC of the liquid crystal layer 21A are in a state of orientation so as to be subjected to rubbing by the orientation films 21B and 21C. More specifically, the liquid crystal molecules MC1 on the side of the incident liquid crystal surface S1 are subjected to rubbing along the y-axis direction (first direction), while the liquid crystal molecules MC2 on the side of the outputting liquid crystal surface S2 are subjected to rubbing along the x-axis direction (second direction).

In the present embodiment, in the not-driven state, the transmissive members 22 and 23 have higher optical refractive indexes than that of the liquid crystal layer 21A. The light incident surface 22A of the transmissive member 22 is inclined with respect to the incident liquid crystal surface S1 of the liquid crystal element 21. Therefore, in the not-driven state, an incident light ray L1 from the light source 11 is incident upon the transmissive member 22 through the light incident surface 22A, and then is totally reflected from the incident liquid crystal surface S1 of the liquid crystal element 21.

Accordingly, when the incident light ray L1 from the light source 11 is incident upon the optical element 21 in the not-driven state, as shown in FIG. 4(*b*), the incident light ray L1 is reflected by the incident liquid crystal surface S1 without being transmitted through the liquid crystal element 21, and then is outputted from the light-outputting surface 22B of the transmissive member 22 as a reflected light ray L2.

Figure 5:
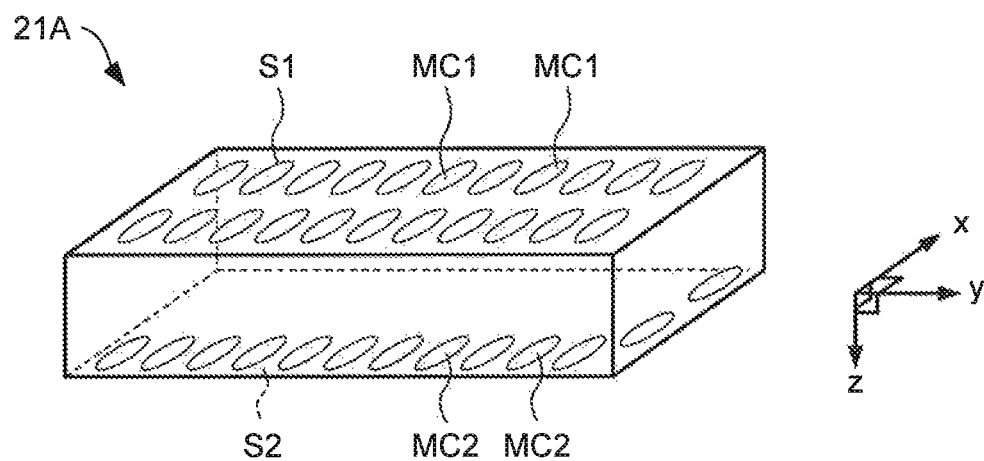
FIG. 5(a) is a view schematically showing an alignment state of liquid crystal molecules in the liquid crystal element of the optical element according to the first embodiment.
FIG. 5(b) is paths of light rays in the optical element according to the first embodiment.
Figure 5:
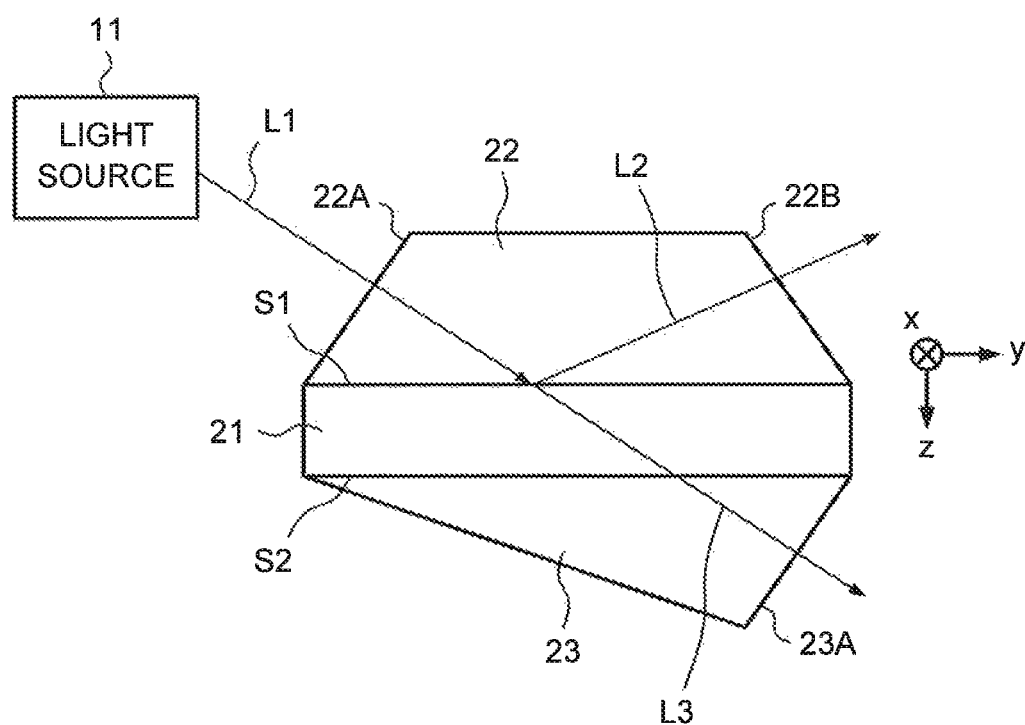

FIG. 5(a) is a view schematically showing the state of orientation of the liquid crystal molecules MC1 and MC2 in a driven state, that is, in a state where the drive signal DS1 is supplied to the drive electrodes 21D. FIG. 5(b) is a view schematically showing the paths of light rays in the optical element 20 in a driven state.

In a driven state, the application of a voltage to the liquid crystal layer 21A changes the rubbing state of the liquid crystal molecules MC1 and MC2 in accordance with an applied electric field. To be more specific, since an electric field is generated in the x-axis direction in the vicinity of the incident liquid crystal surface S1 of the liquid crystal layer 21A, the liquid crystal molecules MC1 on the side of the incident liquid crystal surface S1 are oriented along the x-axis direction.

In this state, when the incident light ray L1 is incident from the light source 11, as shown in FIG. 5(b), a part of the incident light ray L1 is totally reflected from the incident liquid crystal surface S1, and is outputted from the light-outputting surface 22B of the transmissive member 22, as the reflected light ray L2. On the other hand, another part of the incident light ray L1 is transmitted through the incident liquid crystal surface S1, travels through the liquid crystal element 21, and is incident upon the transmissive member 23. The light ray having been transmitted through the liquid crystal element 21 is outputted from the light-outputting surface 23B of the transmissive member 23 as a transmitted light ray L3.

For example, in the present embodiment, the reflected light ray L2 is a P-polarized component (first polarized component) of the incident light ray L1, and the transmitted light ray L3 is an S-polarized component (second polarized component) thereof. This is because the optical refractive index of the liquid crystal layer 21A for the P-polarized component and the optical refractive index of the liquid crystal layer 21A for the S-polarized component are different from each other depending on the state of orientation of the liquid crystal molecules MC1.

More specifically, in the present embodiment, in application of a voltage to the drive electrodes 21D, the transmissive member 22 has a higher optical refractive index for the P-polarizing component of the incident light ray L1 than that of the liquid crystal layer 21A, and has a lower optical refractive index for the S-polarizing component of the incident light ray L1 than that of the liquid crystal layer 21D. Note that the P-polarized component is a polarized component of the incident light ray L1 in which the direction of an electric field (the direction of polarization) is in a direction orthogonal to the direction of orientation of the liquid crystal molecules MC1 under being driven (second direction), in other words, in the direction of orientation of the liquid crystal molecules MC2 (first direction). The S-polarized component is a polarized component of the incident light ray L1 in which the direction of an electric field (the direction of polarization) is in the direction of orientation of the liquid crystal molecules MC1.

Therefore, in the present embodiment, the P-polarized component of the incident light ray L1 is totally reflected from the incident liquid crystal surface S1, while the S-polarized component is transmitted through the incident liquid crystal surface S1. By designing the internal materials of the optical element 20, more specifically, the optical refractive indexes of the transmissive member 22 and the liquid crystal layer 21A and the incident angle of the incident light ray L1, the incident light ray L1 can be easily separated. Since both of the reflected light ray L2 and the transmitted light ray L3 are used, almost all of the incident light ray L1 is extracted. Since the light incident surface 22A of the transmissive member 22 and the light-outputting surface 23A of the transmissive member 23 are disposed in parallel with each other, almost all of the transmitted light ray L3 can be extracted, thus allowing an improvement in light extraction efficiency.

Figure 6:
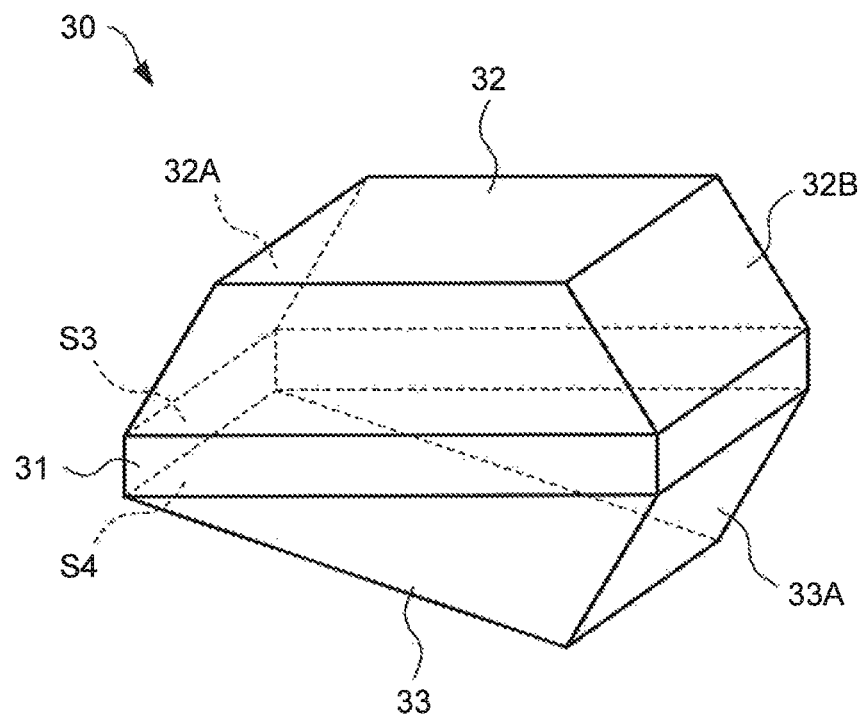
FIGS. 6(a) and 6(b) are perspective views of the optical element in the optical device according to the first embodiment.
Figure 6:
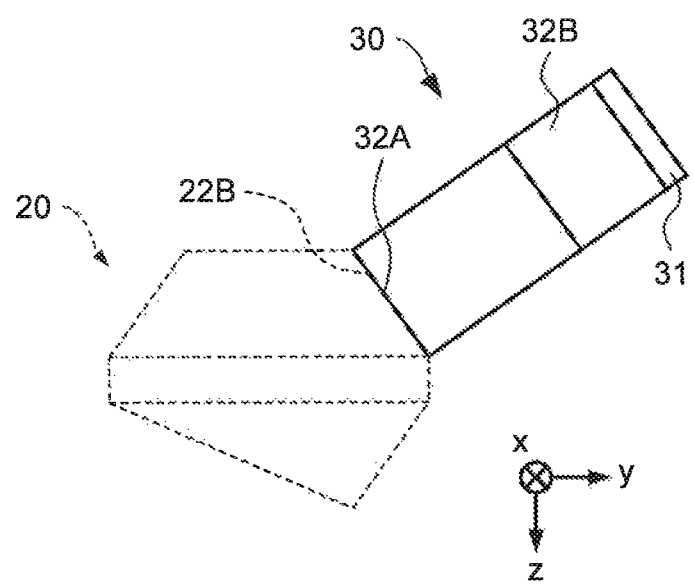

FIG. 6(a) is a schematic perspective view of the optical element 30. FIG. 6(b) is a view schematically showing the arrangement configuration of the optical element 30 with respect to the optical element 20. In the present embodiment, the liquid crystal element 31 and the transmissive members 32 and 33 of the optical element 30 have the same configurations as those of the liquid crystal element 21 and the transmissive members 22 and 23 of the optical element 20.

The liquid crystal element 31 has two main surfaces (third and fourth main surfaces) S3 and S4 opposite to each other. In the present embodiment, the main surface S3 functions as a surface upon which the light rays from the light source 11 and the optical element 20 (the incident light ray L1 and the reflected light ray L2) are incident. The main surface S4 functions as a surface through which the light rays having been transmitted through the main surface S3 are outputted from the liquid crystal element 31. In the following description, the main surface S3 is referred to as an incident liquid crystal surface (third liquid crystal surface), and the main surface S4 is referred to as an outputting liquid crystal surface (fourth liquid crystal surface). In other words, the liquid crystal element 31 has the incident liquid crystal surface S2 and the outputting liquid crystal surface S4 opposite thereto.

The transmissive member 32 is formed on an orientation film 31C of the liquid crystal element 31 on the side of the incident liquid crystal surface S3. The transmissive member 32 has transparency to the light rays from the light source 11. The transmissive member 32 is a transparent medium made of, for example, a glass material or a resin material. In the present embodiment, the transmissive member 32 has the shape of a prism having a trapezoidal cross-section. The transmissive member 32 is formed such that its side surface corresponding to the bottom sides of the trapezoids of the prism is formed on the incident liquid crystal surface S3 of the liquid crystal element 31.

As shown in FIG. 6(b), the transmissive member 32 is joined to the light-outputting surface 22B of the transmissive member 22 of the optical element 20. Therefore, the reflected light ray L2 from the optical element 20 is incident upon the incident liquid crystal surface S3 of the liquid crystal element 31 through the transmissive member 32. The transmissive member 32 has a light incident surface 32A (second light incident surface) upon which the reflected light ray L2 from the optical element 20 is incident.

At least a part of the light ray incident from the light incident surface 32A is reflected from the incident liquid crystal surface S3 of the liquid crystal element 31, and is outputted from the transmissive member 32. The transmissive member 32 has a light-outputting surface (second light-outputting surface) 32B from which the light ray having been reflected by the incident liquid crystal surface S3 is outputted. In the present embodiment, in the transmissive member 32, one of two side surfaces corresponding to legs of the trapezoids of the prism functions as the light incident surface 32A, and the other functions as the light-outputting surface 32B.

The transmissive member 33 is formed on the outputting liquid crystal surface S4 of the liquid crystal element 31. The transmissive member 33 has transparency to the light rays from the light source 11 and the optical element 20. The transmissive member 33 is a transparent medium made of, for example, a glass material or a resin material. In the present embodiment, the transmissive member 33 has the shape of a prism having a triangular cross-section. The transmissive member 32 is formed such that its side surface corresponding to the longest sides of the triangles of the triangular prism is formed on the outputting liquid crystal surface S4 of the liquid crystal element 31.

The light ray having been transmitted through the incident liquid crystal surface S4 of the liquid crystal element 31 and outputted from the outputting liquid crystal surface S4 thereof is outputted through the transmissive member 33. The transmissive member 33 has a light-outputting surface (second light-outputting surface) 33A from which the light ray having been transmitted through the liquid crystal element 31 is outputted.

Figure 7:
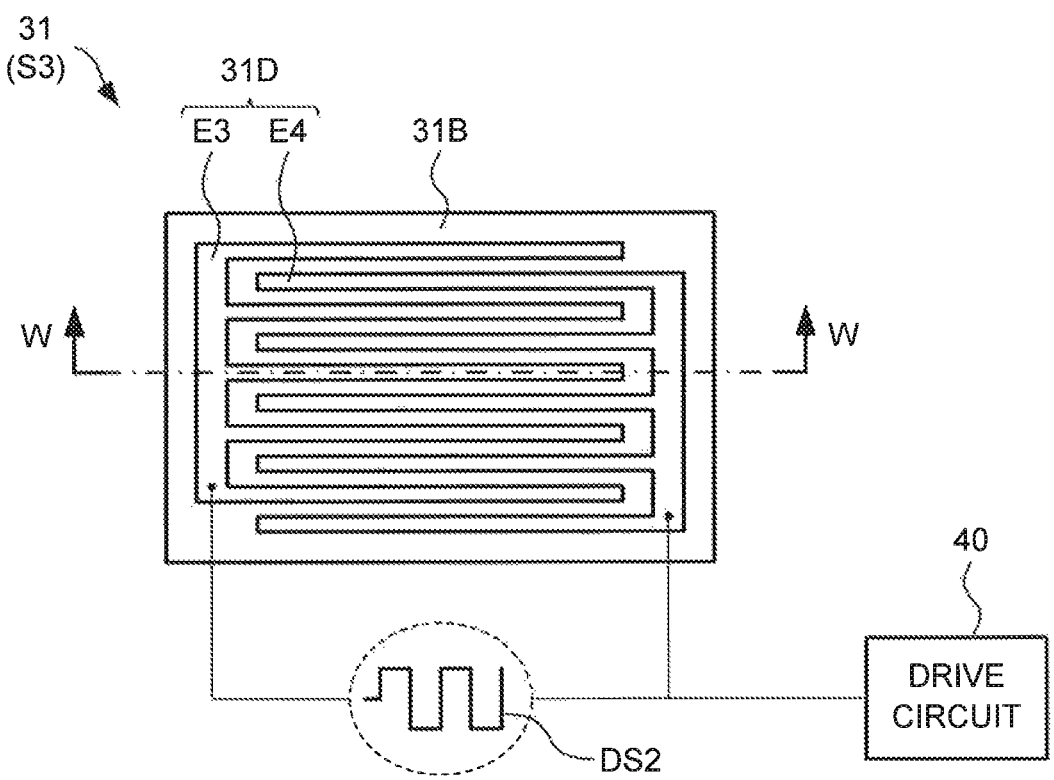
FIGS. 7(a) and 7(b) are a schematic top view and a cross-sectional view of the liquid crystal element in the optical element according to the first embodiment, respectively.
Figure 7:
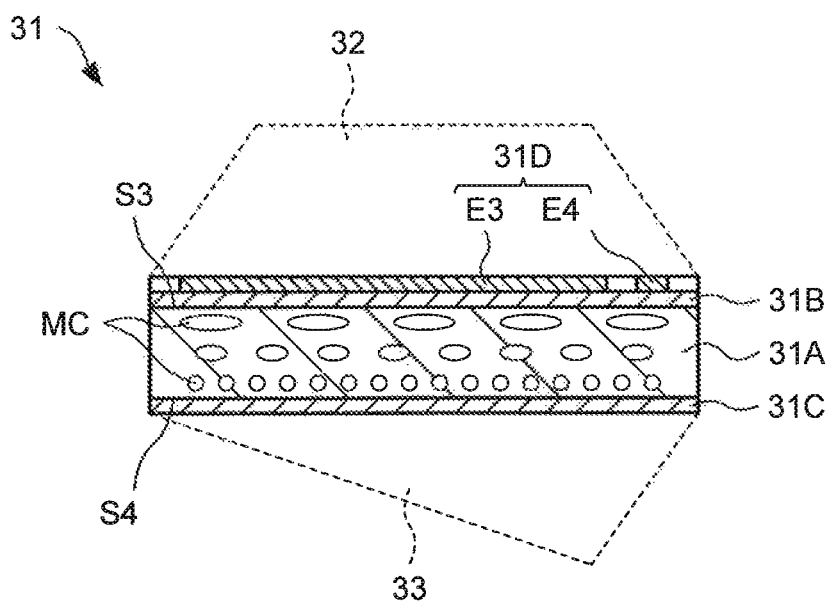

FIG. 7(a) is a schematic top view of the liquid crystal element 31. FIG. 7(a) is a view schematically showing the incident liquid crystal surface 33 of the liquid crystal element 31. FIG. 7(b) is a schematic cross-sectional view of the liquid crystal element 31. FIG. 7(b) is a cross-sectional view taken along line W-W of FIG. 7(a). The configuration of the liquid crystal element 31 will be described with reference to FIGS. 7(a) and 7(b).

As in the case of the liquid crystal element 21, the liquid crystal element 31 includes a liquid crystal layer 31A containing liquid crystal molecules MC, orientation films (third and fourth orientation films) 31B and 31C formed opposite to each other so as to sandwich the liquid crystal layer 31A, and drive electrodes (second drive electrodes) 31D formed on the orientation film 31B.

Note that, in the present embodiment, the incident liquid crystal surface S3 of the liquid crystal element 31 is a surface of the liquid crystal layer 31A on the side of the transmissive member 32, and the outputting liquid crystal surface S4 is a surface of the liquid crystal layer 31A on the side of the transmissive member 33. In the present embodiment, the transmissive member 32 is formed on the orientation film 31B (in the present embodiment, on the drive electrodes 31D) on the side of the incident liquid crystal surface S3. The transmissive member 33 is formed on the orientation film 41C on the side of the outputting liquid crystal surface S4.

The liquid crystal layer 31A contains, for example, rod-shaped nematic liquid crystal, as the liquid crystal molecules MC. The orientation films 31B and 31C are made of, for example, film-shaped polyimide to which an orientation process has been applied. The orientation films 31B and 31C have transparency to the light rays from the optical element 20. The liquid crystal molecules MC in the liquid crystal layer 31A are subjected to rubbing by the orientation films 31B and 31C.

The drive electrode 31D has transparency to the light rays from the light source 11 and the optical element 20. The drive electrodes 31D are composed of a pair of electrodes (third and fourth electrodes) E3 and E4 in stripes that extend on the orientation film 31B in the incident direction of the light ray from the optical element 20. In the present embodiment, the electrodes E3 and E4 are made of transparent conductive oxide films such as ITO or IZO.

In the present embodiment, the electrodes E3 and E4 are formed in the shape of combs on the orientation film 31B such that the stripes thereof are staggered with respect to each other. To be more specific, the electrode E3 has stripes (comb teeth) extending from the light incident surface 32A toward the light-outputting surface 32B on the orientation film 31B. The electrode E4 has stripes (comb teeth) extending from the light-outputting surface 32B toward the light incident surface 32A on the orientation film 31B.

In the present embodiment, the drive circuit 40 applies an alternating voltage between the electrodes E3 and E4 as a drive signal DS2. An electric field is thereby generated in a direction orthogonal to the incident direction of the incident light rays from the optical element 20 in the vicinity of the incident liquid crystal surface S3 of the liquid crystal layer 31A.

Figure 8:
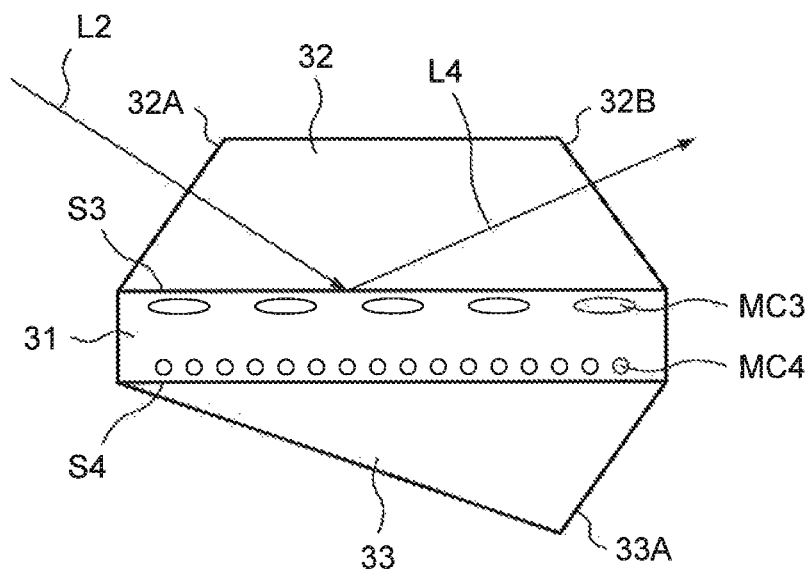
FIGS. 8(a) and 8(b) are views schematically showing an alignment state of liquid crystal molecules in the liquid crystal element of the optical element according to the first embodiment and paths of light rays in the optical element.
Figure 8:
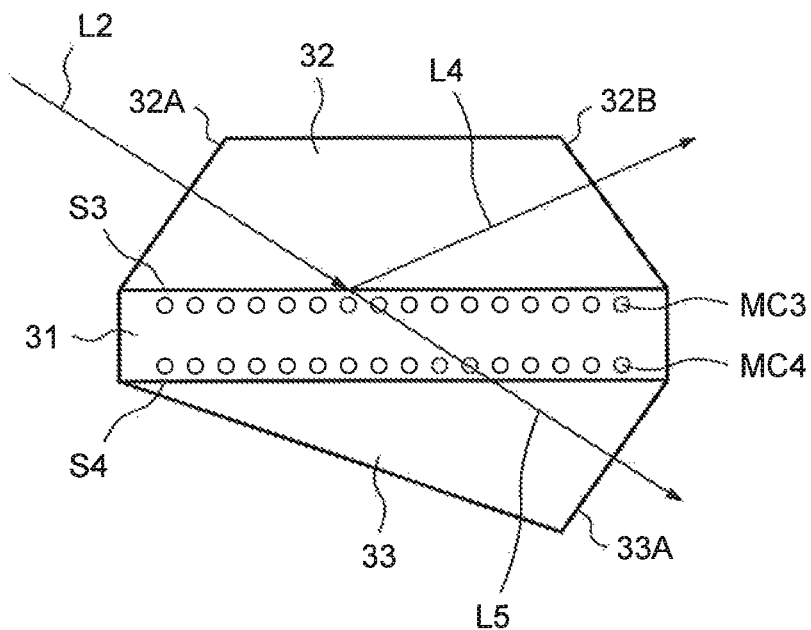

FIG. 8(a) is a view that schematically shows the state of orientation of the liquid crystal molecules MC in the liquid crystal layer 31A and the paths of light rays in the optical element 30, in the not-driven state, in other words, in a state that the drive signal DS2 is not supplied to the drive electrodes 31D. In the present embodiment, an incident light ray upon the optical element 30 is the reflected light ray L2 generated by the optical element 20.

In the not-driven state, a voltage is not applied to the liquid crystal layer 31A. Therefore, as shown in FIG. 8(a), the liquid crystal molecules MC of the liquid crystal layer 31A is in a state of orientation so as to be subjected to rubbing by the orientation films 31B and 31C. More specifically, liquid crystal molecules MC3 on the side of the incident liquid crystal surface S3 are subjected to rubbing along the incident direction of the reflected light ray L2 in a direction within the liquid crystal layer 31A, while liquid crystal molecules MC4 on the side of the outputting liquid crystal surface S4 are subjected to rubbing along a direction orthogonal thereto.

Accordingly, in the not-driven state, the reflected light ray L2 from the optical element 20 is incident upon the transmissive member 32 through the light incident surface 32A, and totally reflected from the incident liquid crystal surface S3 of the liquid crystal element 31. Therefore, when the reflected light ray (primary reflected light ray) L2 is incident upon the optical element 31 in the not-driven state, as shown in FIG. 8(a), the reflected light ray L2 is reflected by the incident liquid crystal surface S3 without being transmitted through the liquid crystal element 31, and then is outputted from the light-outputting surface 32B of the transmissive member 32 as a reflected light ray (secondary reflected light ray) L4.

FIG. 8(b) is a view schematically showing the state of orientation of the liquid crystal molecules MC3 and MC4 and the paths of light rays in the optical element 30, in the driven state, in other words, in a state that the drive signal DS2 is supplied to the drive electrodes 31D.

In the driven state, the application of a voltage to the liquid crystal layer 21A changes the rubbing state of the liquid crystal molecules MC3 and MC4 in accordance with an applied electric field. To be more specific, the liquid crystal molecules MC3 on the side of the incident liquid crystal surface S3 are oriented along a direction orthogonal to the incident direction of the reflected light ray L2 in a direction within the liquid crystal layer 31A.

In this state, when the reflected light ray L2 from the optical element 20 is incident, as shown in FIG. 8(b), a part of the reflected light ray L2 is totally reflected from the incident liquid crystal surface S3, and is outputted from the light-outputting surface 32B of the transmissive member 32, as a reflected light ray L4. On the other hand, another part of the reflected light ray L2 is transmitted through the incident liquid crystal surface S3, travels through the liquid crystal element 31, and is incident upon the transmissive member 33. The light ray having been transmitted through the liquid crystal element 31 is outputted from the light-outputting surface 33B of the transmissive member 33 as a transmitted light ray L5. For example, in the present embodiment, the reflected light ray L4 is a P-polarized component of the reflected light ray L2, and the transmitted light ray L5 is an S-polarized component thereof.

Figure 9:
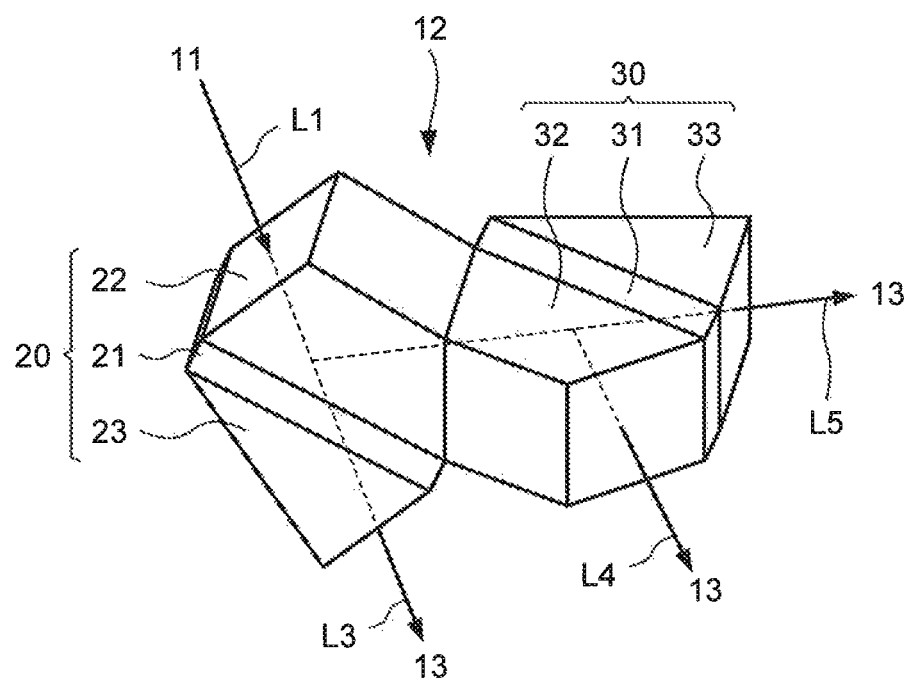
FIG. 9 is a view schematically showing the paths of light rays in the optical device according to the first embodiment.

FIG. 9 is a view schematically showing the paths of the light rays in the optical elements 20 and 30 of the optical device 12. The optical elements 20 and 30, as described above, can obtain the three output light rays from the incident light ray L1 from the light source 11 (from outside), by control of the drive configuration of each of the liquid crystal elements 21 and 31, in other words, the state of application of voltages to the liquid crystal elements 21 and 31. To be more specific, as shown in FIG. 9, in the present embodiment, the three light rays, including the transmitted light ray L3 having been transmitted through the liquid crystal element 21 of the optical element 20, the reflected light ray L4 having been incident from the optical element 20 upon the optical element 30 and reflected by the liquid crystal element 31, and the transmitted light ray L5 having been transmitted through the liquid crystal element 31 are incident upon the output device 13, as external output light rays. In other words, the light rays L3 to L5 are externally outputted from the output device 13.

As described above, the optical device 12 generates the three output light rays L3 to L5 from the incident light ray L1 from outside. Therefore, the output light rays L3 to L5 are generated in the device with a low light loss and high driving responsiveness.

More specifically, the optical elements 20 and 30 generate the output light rays without using a light shielding element. For example, to generate the reflected light ray L2 and the transmitted light ray L3 as the output light rays, the optical element 20 uses the light ray having been totally reflected from the incident liquid crystal surface S1 of the liquid crystal layer 21A, or the light ray having been transmitted through the liquid crystal layer 21A. At this time, almost all of the incident light ray L1 is used without using a polarizing plate, so that the light ray can be extracted with high efficiency. Since the same goes for the optical element 30, the output light rays L3 to L5 extracted from the optical elements 20 and 30 are generated using almost all of the incident light ray L1.

Only the liquid crystal layer 21A or 31A is an element to be driven, and another driven member is not used. Accordingly, by configuring the liquid crystal layers 21A and 31A of high responsiveness, the responsiveness of the entire elements or the entire device is improved. There is no need to adjust a delay in response with other elements.

In addition, since it is possible to realize light extraction of a plurality of systems with a small number of components, the entire device becomes compact. In addition, the stability against the influence of the operating environment such as vibration and temperature is high.

Note that as the use application of the light source system 10, for example, a light projection member, that is, a lamp can be configured. For example, the light may be projected to different areas depending on the output light rays, and in some cases the entire area may be illuminated. The light source system 10 becomes a compact, highly efficient and highly responsive projector.

The configurations of the optical elements 20 and 30 in the present embodiment is only an example. For example, the rubbing configuration of the orientation films 21B and 21C, the configuration in the voltage application direction by the drive electrodes 21D, and the configurations of the transmissive members 22 and 23 are not limited thereto. In addition, it is also possible to add another element according to the number of systems for the output light rays to be extracted. Hereinafter, various other configuration examples will be described as modifications of the present embodiment.

Figure 10:
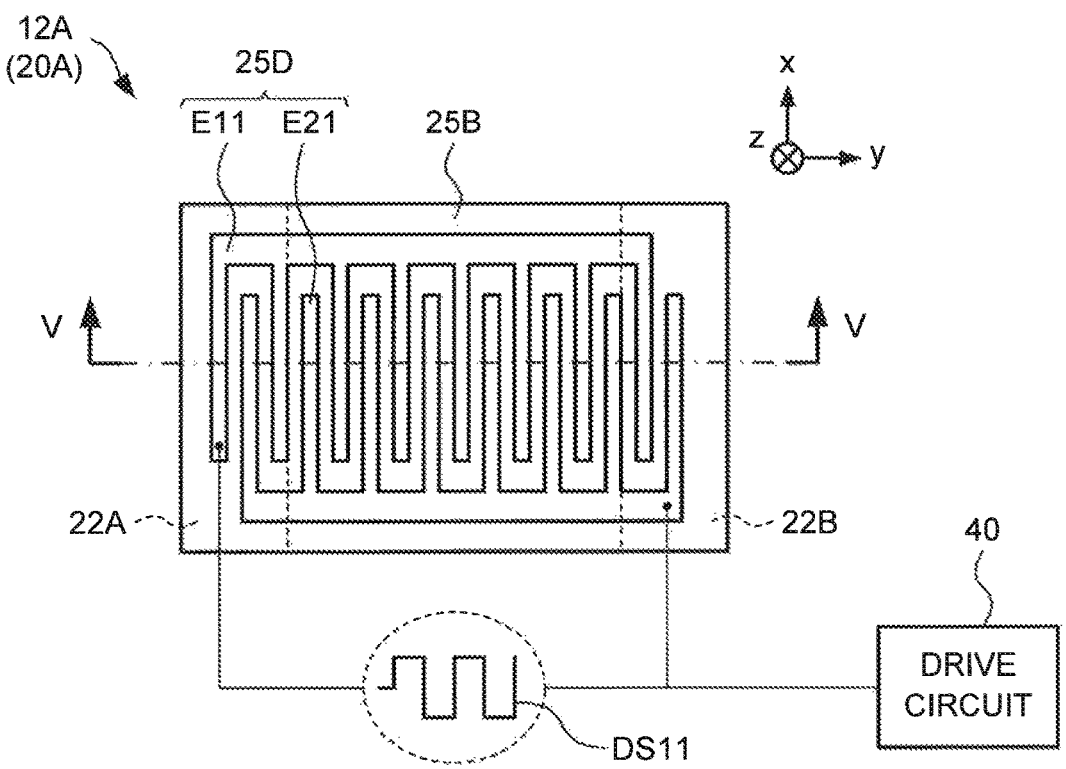
FIGS. 10(a) and 10(b) are a schematic top view and a cross-sectional view of an optical element according to a first modification of the first embodiment, respectively.
Figure 10:
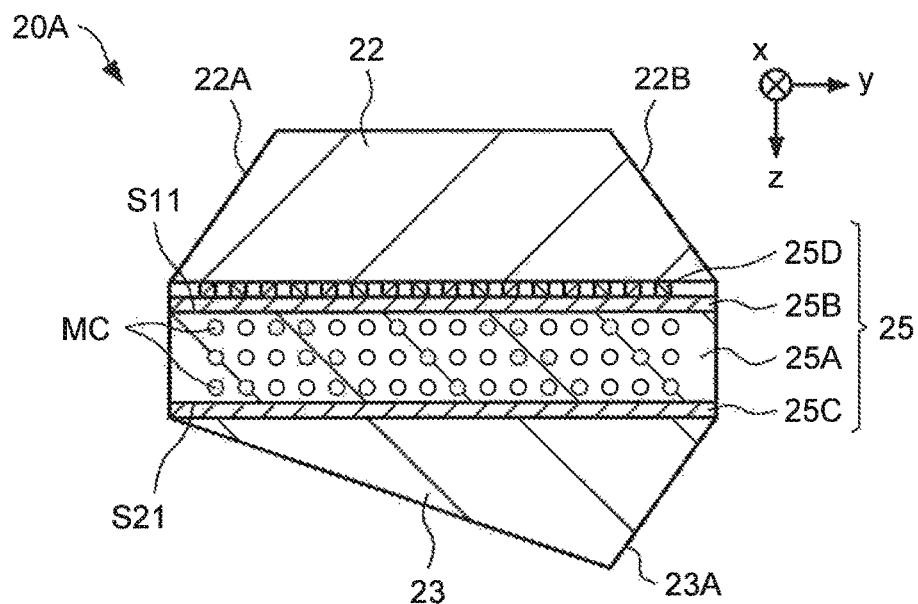

FIGS. 10(a) and 10(b) are a schematic top view and a cross-sectional view of an optical device 12A according to a first modification of the first embodiment, respectively. The optical device 12A has the same configuration as that of the optical device 12 except for the configuration of an optical element 20A. In the present embodiment, the optical device 12A has the optical element 20A instead of the optical element 20.

In the present modification, the optical element 20A has the same configuration as that of the optical element 20 except for the configuration of a liquid crystal element 25. The liquid crystal element 25 has a liquid crystal layer 25A that has liquid crystal molecules MC, and in which one main surface S11 is an incident liquid crystal surface and a main surface S12 opposite to the main surface S11 is an outputting liquid crystal surface. In addition, the liquid crystal element 25 has orientation films 25B and 25C formed on the incident liquid crystal surface S11 and the outputting liquid crystal surface S12 of liquid crystal layer 25A, respectively, for orienting the liquid crystal molecules MC in the x-axis direction.

In addition, the liquid crystal element 25 has drive electrodes 25D formed on the orientation film 25B. The drive electrodes 25D are composed of a pair of electrodes (first and second electrodes) E11 and E21 in stripes that extend on the orientation film 25B in the x-axis direction, that is, along a direction orthogonal to the incident direction of the incident light ray L1 from the light source 11.

The optical element 20A has a configuration in which the rubbing direction of the liquid crystal molecules MC by the orientation film 25B is orthogonal to that in the optical element 20. Also, the optical element 20A has a configuration in which the direction of the electric field generated by the electrodes E11 and E21 is orthogonal to that in the optical element 20.

Figure 11:
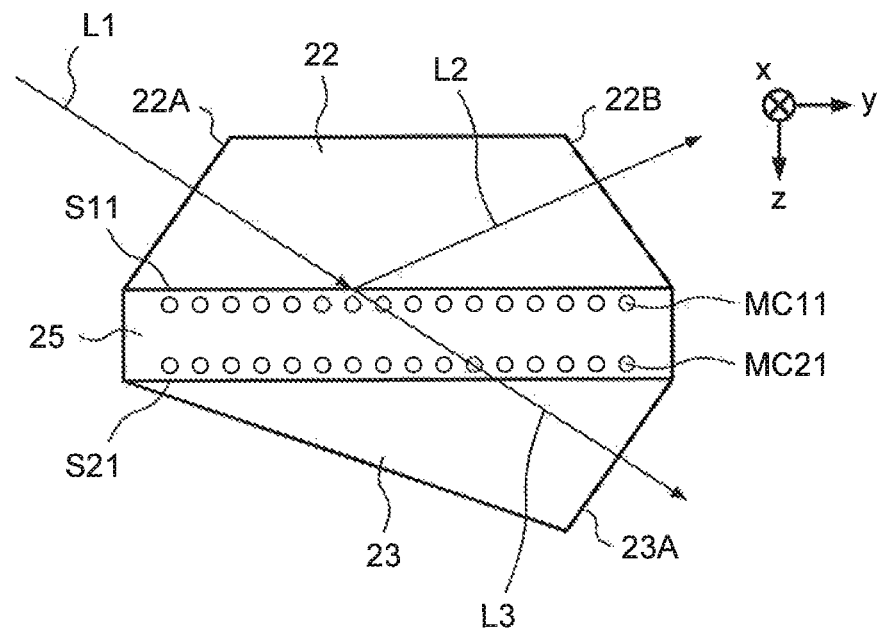
FIGS. 11(a) and 11(b) are views schematically showing an alignment state of liquid crystal molecules in the liquid crystal element of the optical element according to the first modification of the first embodiment and paths of light rays in the optical element.
Figure 11:
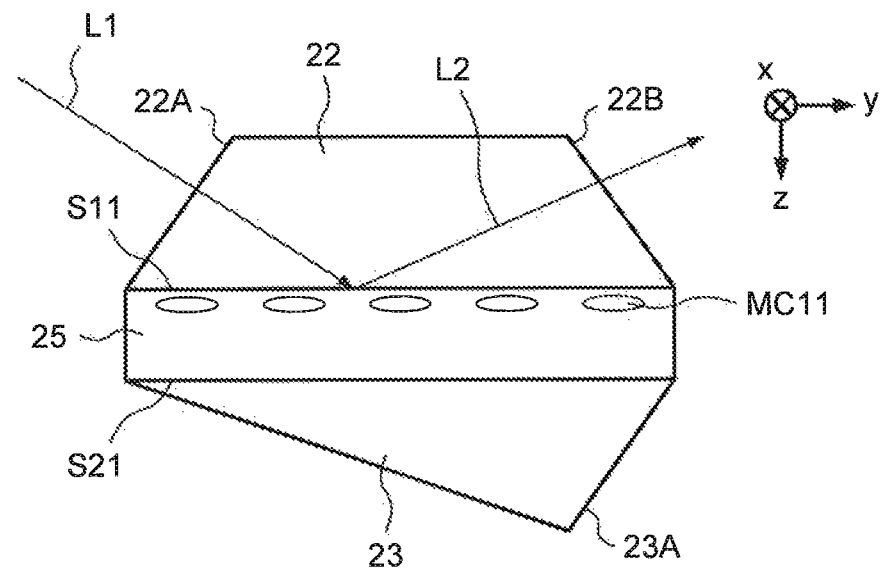

FIGS. 11(a) and 11(b) are views schematically showing the state of orientation of the liquid crystal molecules MC and the paths of light rays in the optical element 20A in a not-driven state and in a driven state in the optical element 20A, respectively. As shown in FIG. 11(a), in the not-driven state, both the liquid crystal molecules MC11 in the vicinity of the incident liquid crystal surface S11 and the liquid crystal molecules MC21 in the vicinity of the outputting liquid crystal surface S21 are oriented in the x-axis direction, that is, along the direction orthogonal to the incident direction of the incident light ray L1. This is the same state as that in a driven state (such as FIG. 5(a)) in the optical element 20.

Therefore, in the not-driven state of the optical element 20A, a part of the incident light ray L1 incident from the light incident surface S11 of the transmissive member 22 is totally reflected from the incident liquid crystal surface S11, and another part thereof is transmitted through the liquid crystal element 25. Therefore, the totally reflected light is outputted from the light-outputting surface 22B of the transmissive member 22 as the reflected light ray L2 (that is, to be incident on the optical element 30). The light having been transmitted through the liquid crystal element 25 is outputted from the light-outputting surface 23A of the transmissive member 23 as a transmitted light ray L3 (that is, to be outputted by the output device 13).

On the other hand, as shown in FIG. 11(b), in a driven state of the optical element 20A, the electrodes E11 and E21 generate an electric field in the y-axis direction in the vicinity of the incident liquid crystal surface S11. Therefore, the liquid crystal molecules MC11 in the vicinity of the incident liquid crystal surface S11 are oriented in the y-axis direction. This state is the same as that of the optical element 20 in a not-driven state (such as FIG. 4(a)). Therefore, all of the incident light ray L1 is totally reflected by the incident liquid crystal surface S11, and outputted from the light-outputting surface 22B of the transmissive member 22 as the reflected light ray L2.

Like the present modification, the optical device may have the orientation film 25B for rubbing the liquid crystal molecules MC in the direction orthogonal to the incident direction of the incident light ray L1, and the drive electrodes 25D which apply an electric field so that the liquid crystal molecules MC11 on the side of the incident liquid crystal surface S11 out of the rubbed liquid crystal molecules MC are oriented orthogonal to the rubbing direction.

Figure 12:
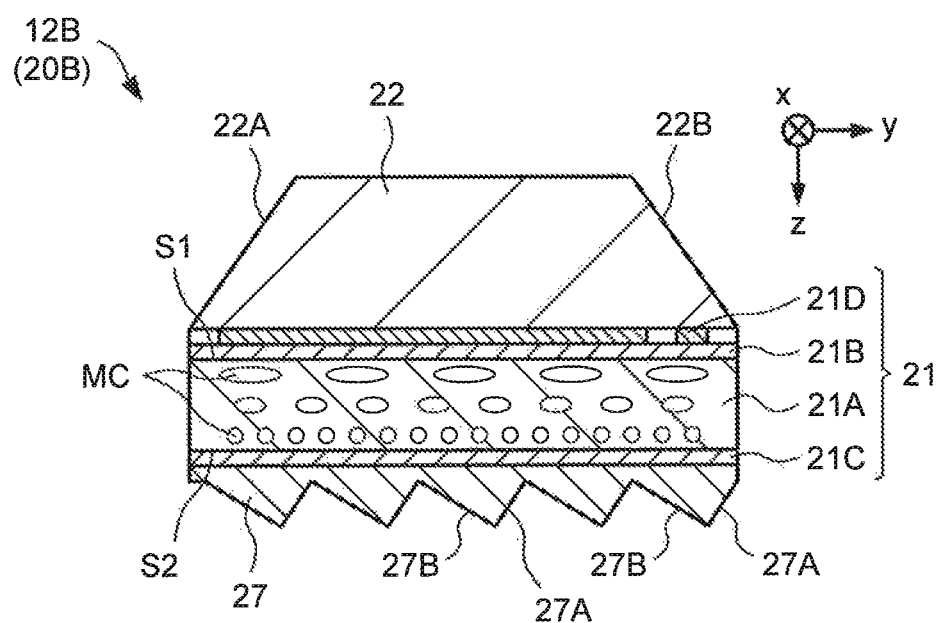
FIG. 12 is a schematic cross-sectional view of an optical element according to a second modification of the first embodiment.

FIG. 12 is a schematic cross-sectional view of an optical element 20B in an optical device 12B according to a second modification of the first embodiment. The optical device 12B has an optical element 20B instead of the optical element 20 of the optical device 12. The optical element 20B has the same configuration as that of the optical element 20 except for the configuration of a transmissive member 27.

The optical element 20B has the transmissive member 27 formed on the orientation film 21C on the side of the outputting liquid crystal surface S2. The transmissive member 27 has a plurality of light-outputting surfaces 27A formed in a step-like manner. Each of the outputting surfaces 27A is formed in parallel with the light incident surface 22A of the transmissive member 22. In addition, the transmissive member 27 has a perpendicular surface 27B perpendicular to the light incident surface 22A between the light-outputting surfaces 27A.

In the present embodiment, the extraction efficiency of the transmitted light ray L3 can be improved while the size thereof is compacted in the transmissive member 27 on the side of the incident liquid crystal surface S2. Specifically, first, the transmissive member 27 is miniaturized by forming the transmissive member 27 in a step-like manner. Further, since the light-outputting surfaces 27A are disposed perpendicularly to the transmitted light ray L3, which is a light ray as a result of the incident light ray L1 having been transmitted, most of the light ray is extracted outside. Furthermore, since the perpendicular surface 27B provided between the light-outputting surfaces 27A is provided in parallel with the transmitted light ray L3, the light extraction of the transmitted light ray L3 is not inhibited. Therefore, compactification and high light extraction efficiency can be achieved.

Figure 13:
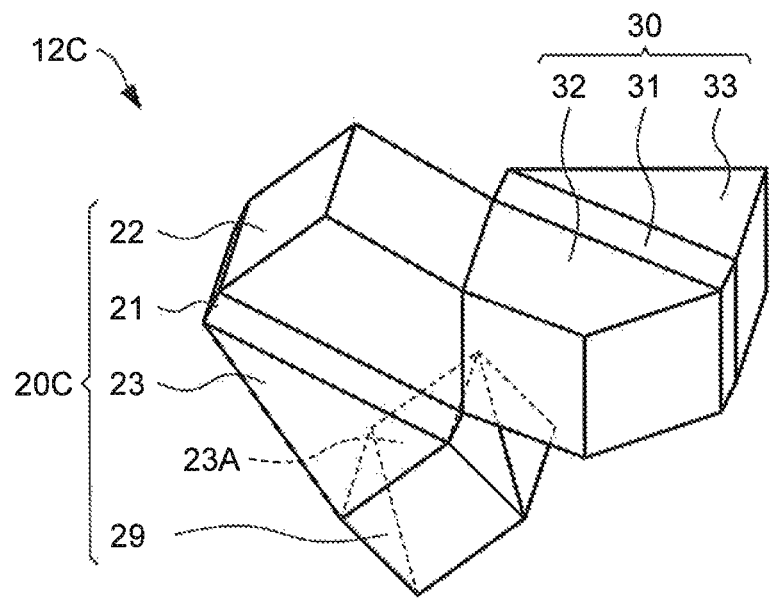
FIG. 13(a) is a perspective view of an optical device according to a third modification of the first embodiment.
FIG. 13(b) is a view schematically showing paths of light rays in the optical device according to the third modification of the first embodiment.
Figure 13:
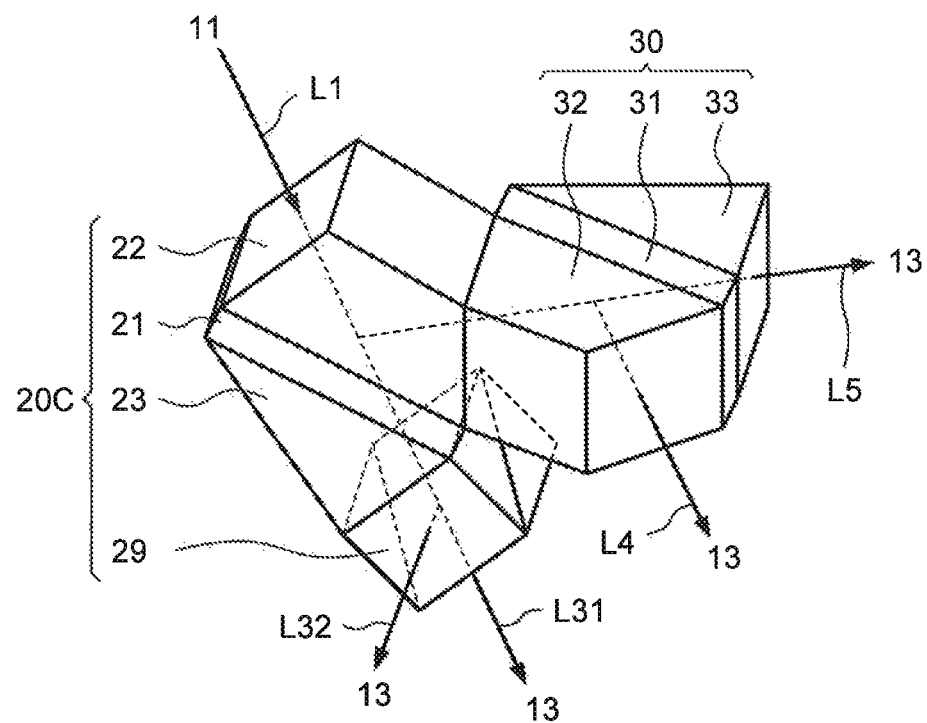

FIG. 13(a) is a schematic perspective view of an optical device 12C according to a third modification of the first embodiment. The optical device 12 has the same configuration as that of the optical device 12 except for the configuration of an optical element 20C. The optical element 20C has a polarizing beam splitter 29 provided on the light-outputting surface 23A of the transmissive member 23.

FIG. 13(b) is a view schematically showing the paths of light rays in the optical device 12C. The present modification corresponds to a configuration in which a polarizing beam splitter 29 is added to the optical elements 20 and 30. As a result, the number of systems for output light rays output from the optical device 12 can be increased by one, and optical outputs with a total of four systems can be achieved. Specifically, the polarizing beam splitter 29 splits the transmitted light ray L3 having been transmitted through the liquid crystal element 21 (liquid crystal layer 21A) into two output light rays L31 and L32. Therefore, the optical device 12C can output the light of the output light rays L31 and L32, and the output light rays L4 and 5. With this configuration, it is possible to provide a highly flexible light source system corresponding to light branching to various output destinations.

In the present modification, the case where the optical device 12C has the polarizing beam splitter 29 has been described. However, the member for splitting the transmitted light ray L3 having been transmitted through the liquid crystal element 21 is not limited to the polarizing beam splitter 29. For example, the optical device 12C may have a polarization mirror that reflects a specific polarized component of the transmitted light ray L3 and transmits another specific polarized component, instead of the polarizing beam splitter 29.

Thus, in the present embodiment, the optical device 12 has the optical elements 20 and 30. In addition, the optical element 20 includes the liquid crystal molecules MC, and has the liquid crystal element 21 including the liquid crystal layer 21A having the incident liquid crystal surface S1 on which the incident light ray L1 from the outside is incident and the outputting liquid crystal surface S2 opposite thereto. In addition, the optical element 30 includes the liquid crystal element 31 including the liquid crystal layer 31A that includes the liquid crystal molecules MC, and has the incident liquid crystal surface S3 on which incident light rays (reflected light ray L2) from the optical element 20 are incident and the outputting liquid crystal surface S4 opposed thereto. Also, the transmissive member 32 of the optical element 30 is joined to the light-outputting surface 22B of the optical element 20.

Also, the optical element 20 has the orientation film 21B formed on the incident liquid crystal surface S1 of the liquid crystal layer 21A, for orienting the liquid crystal molecules MC1 in the first direction (for example, in the y-axis direction) in the in-plane direction of the incident liquid crystal surface S1, and the orientation film 21C formed on the outputting liquid crystal surface S2, for orienting the liquid crystal molecules MC2 in the second direction (for example, in the x-axis direction) orthogonal to the first direction in the in-plane direction of the outputting liquid crystal surface S2. The optical element 20 also has the drive electrodes 21D that are formed on the orientation film 21B, and generate an electric field that orients the liquid crystal molecules MC in the first direction on the incident liquid crystal surface S1 by application of a voltage. Therefore, it is possible to provide the optical element 20 and the optical device 12 that have high driving responsiveness, and enables the extraction of light with high efficiency.

Second Embodiment

Figure 14:
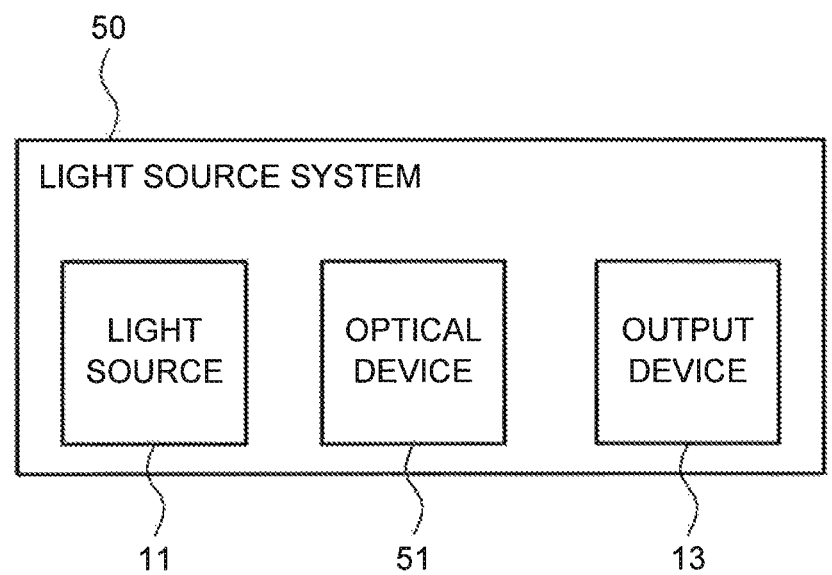
FIG. 14(a) is a block diagram showing a light source system including a configuration of an optical device according to a second embodiment.
FIG. 14(b) is a perspective view of the optical device according to the second embodiment.
Figure 14:
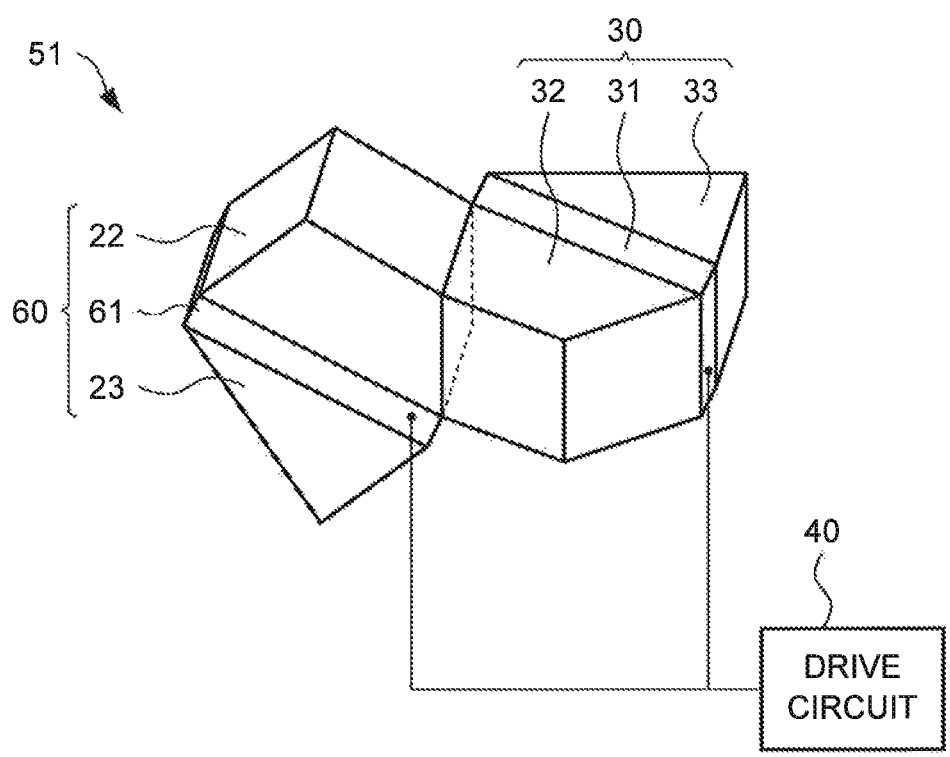

FIG. 14(a) is a block diagram of a light source system 50 according to a second embodiment. The light source system 50 has the same configuration as that of the light source system 10 except for the configuration of an optical device 51. The optical device 51 performs optical processes on the incident light ray L1 from the light source 11. FIG. 14(b) is a schematic perspective view of the optical device 51. The optical device 51 has the same configuration as that of the optical device 12 except that the optical device 51 has an optical element 60 instead of the optical element 20. The optical element 60 has the same configuration as that of the optical element 20 except for the configuration of a liquid crystal element 61.

Figure 15:
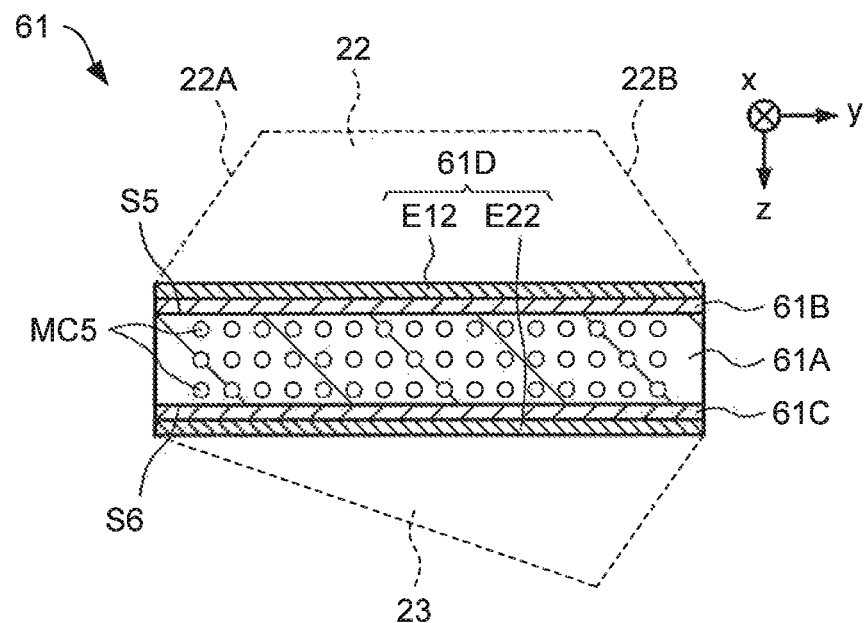
FIG. 15(a) is a schematic cross-sectional view of the liquid crystal element in the optical element according to the second embodiment.
FIG. 15(b) is a view schematically showing paths of light rays in the optical element according to the second embodiment.
Figure 15:
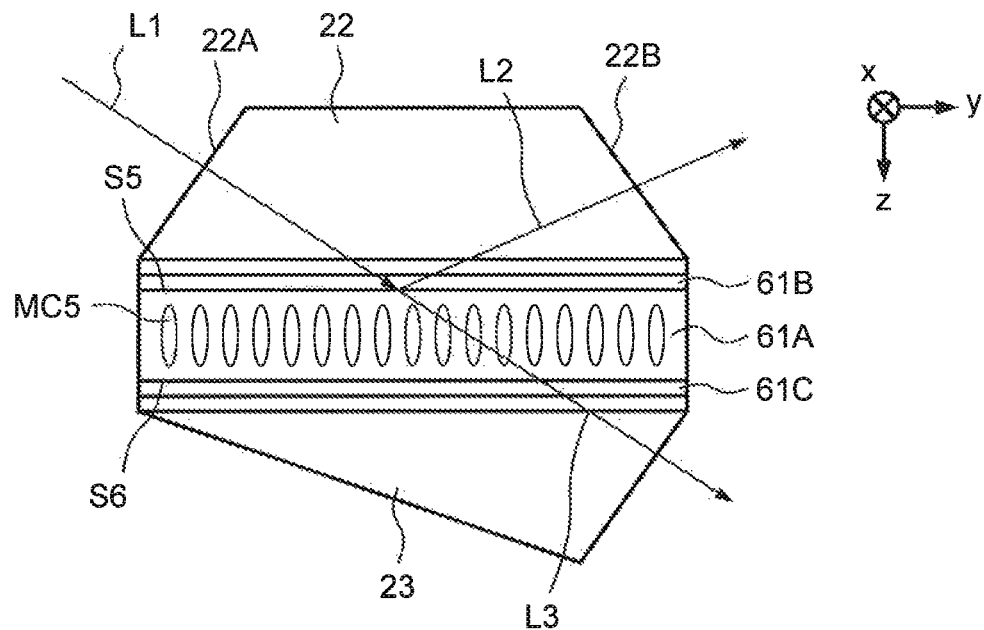

FIG. 15(a) is a schematic cross-sectional view of the liquid crystal element 61. The liquid crystal element 61 has: a liquid crystal layer 61A that has liquid crystal molecules MC5, and an incident liquid crystal surface S5 and an outputting liquid crystal surface S6; orientation films 61B and 61C formed on the incident liquid crystal surface S5 and the outputting liquid crystal surface S6; and drive electrodes 61D formed on the orientation films 61B and 61C.

The orientation films 61B and 61C are configured to rub the liquid crystal molecules MC5 in the liquid crystal layer 61C in a direction orthogonal to the incident direction of the light from the light source 11. Further, the drive electrodes 61D are composed of electrodes E12 and E22 formed on the orientation films 61B and 61C, respectively. The electrodes E12 and E22 have transparency to the light rays from the light source 11. For example, the electrodes may be configured from an ITO film, or may be configured from a metal mesh.

FIG. 15(b) is a view schematically showing the paths of light rays in the optical element 60. In the present embodiment, the drive electrodes 61D are formed to be opposite to each other so as to sandwich the liquid crystal layer 61A. Accordingly, when the element is in a driven state, that is, a voltage is applied to the drive electrodes 61D (between the electrodes E12 and E22), an electric field is generated in the z-axis direction, that is, the thickness direction of the liquid crystal layer 61C.

Therefore, the liquid crystal molecules MC5 are oriented in the z-axis direction. In this case, when the incident light ray L1 from the light source 11 is incident, a reflected light ray L2 that is totally reflected on the incident liquid crystal surface S5 and a transmitted light ray L3 that transmits the liquid crystal element 61 are generated. For example, the reflected light ray L2 is the S-polarized component of the incident light ray L1, and the transmitted light ray L3 is the P-polarized component. In a not-driven state, the state of orientation of the liquid crystal molecules MC5 is the same as that of the optical element 20 in a driven state. Therefore, for example, the P-polarized component is the reflected light ray L2, and the S-polarized component is the transmitted light ray L3.

In other words, from the optical element 60, both the reflected light ray L2 and the transmitted light ray L3 are extracted although the relationship between transmission and reflection changes in both in a driven state and in a not-driven state. Thus, even if the optical element 60 is configured in this manner, it is possible to provide the optical element 60 and the optical device 51 that have high driving responsiveness, and enables the extraction of light with high efficiency.

Third Embodiment

Figure 16:
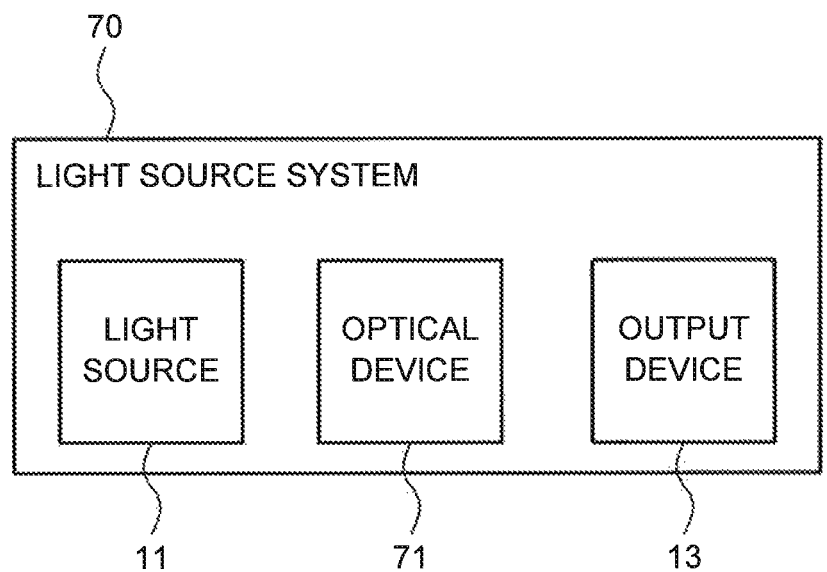
FIG. 16(a) is a block diagram showing a light source system including a configuration of an optical device according to a third embodiment.
FIG. 16(b) is a perspective view of the optical device according to the third embodiment.
Figure 16:
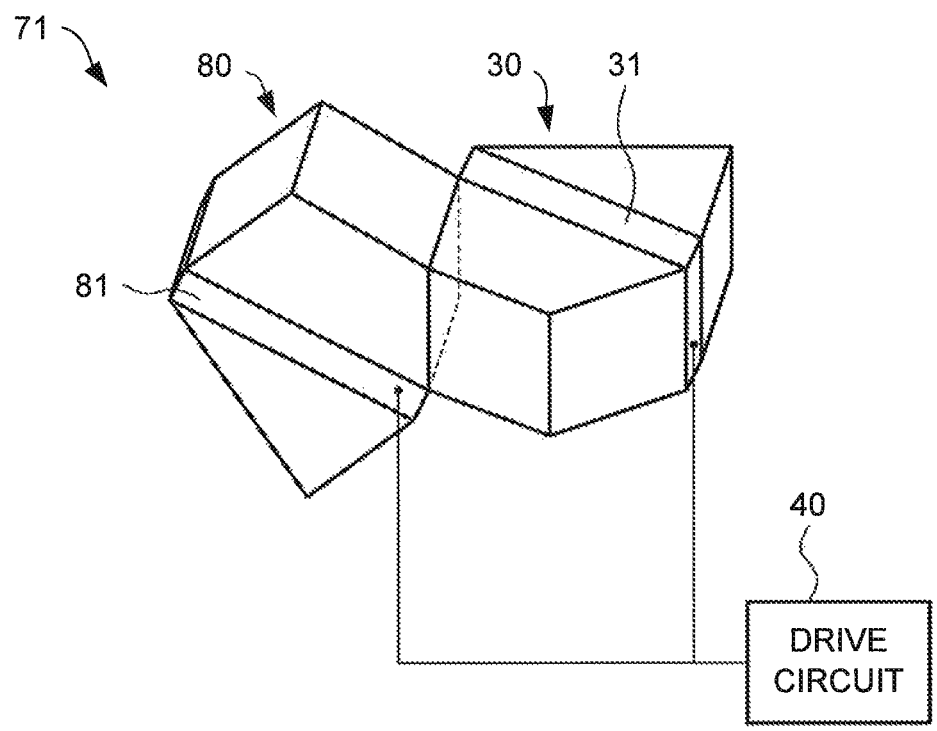

FIG. 16(a) is a block diagram of a light source system 70 according to a third embodiment. The light source system 70 has the same configuration as that of the light source system 10 except for the configuration of an optical device 71. The optical device 71 performs optical processes on the incident light ray L1 from the light source 11. FIG. 16(b) is a schematic perspective view of the optical device 71. The optical device 71 has the same configuration as that of the optical device 12 except that the optical device 71 has an optical element 80 instead of the optical element 20. The optical element 80 has a liquid crystal element 81.

Figure 17:
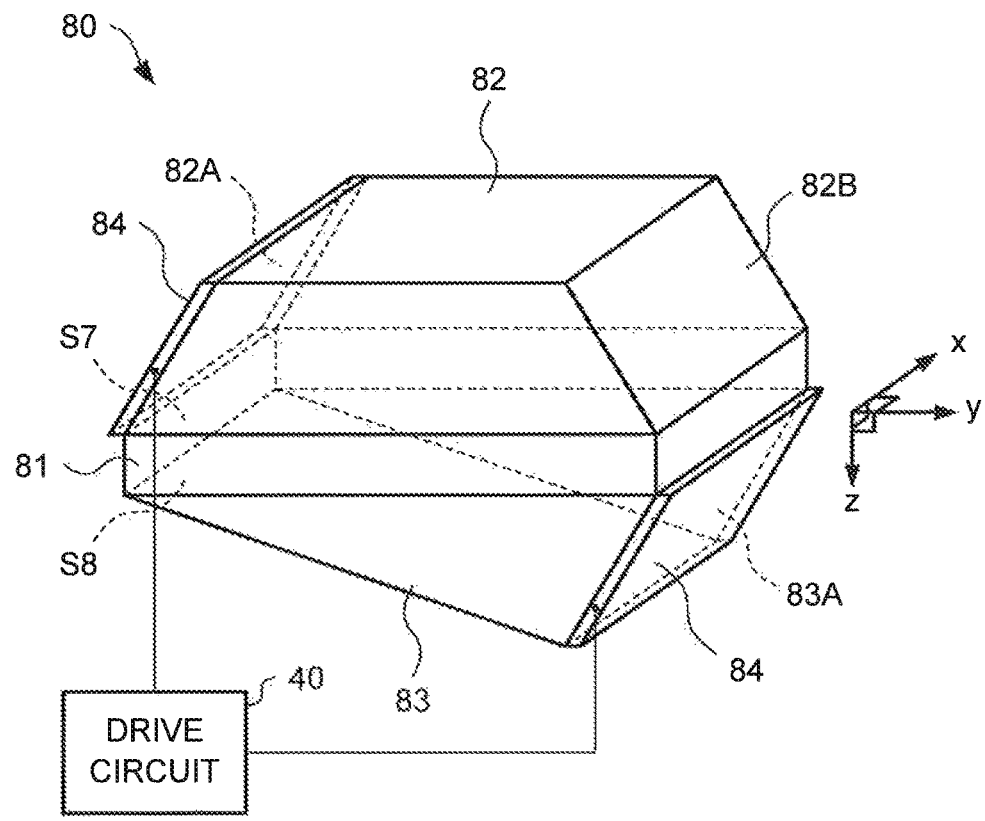
FIGS. 17(a) and 17(b) are a schematic top view and a cross-sectional view of the liquid crystal element in the optical element according to the third embodiment, respectively.
Figure 17:
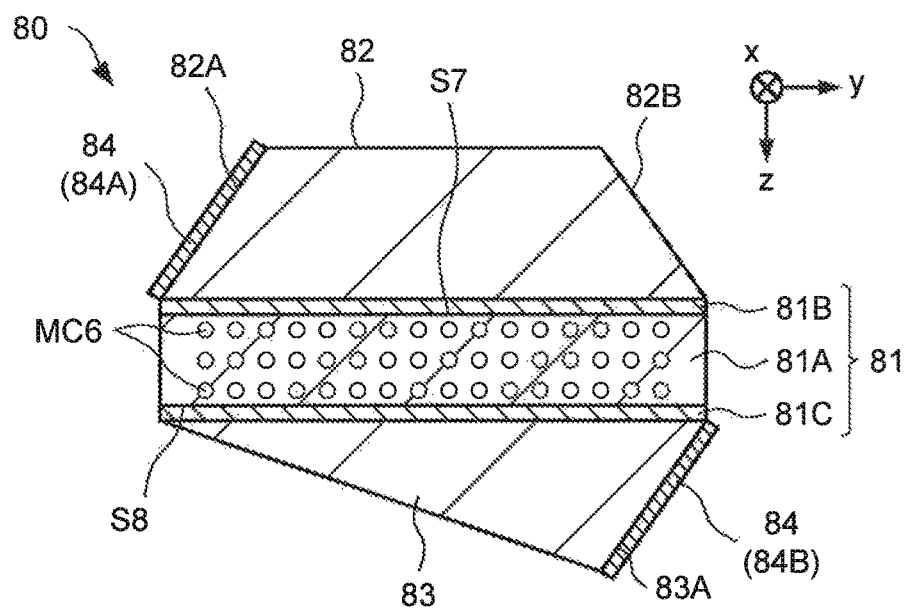

FIG. 17(a) is a schematic perspective view of the optical element 80. FIG. 17(b) is a schematic cross-sectional view of the optical element 80. The optical element 80 has the liquid crystal element 81, transmissive members 82 and 83, and drive electrodes 84.

In the present embodiment, the liquid crystal element 81 has: a liquid crystal layer 81A that has liquid crystal molecules MC6, and has an incident liquid crystal surface S7 and an outputting liquid crystal surface S8; and orientation films 81B and 81C formed on the incident liquid crystal surface S7 and the outputting liquid crystal surface S8 with the liquid crystal layer 81A interposed therebetween. The optical element 80 has a transmissive member 82 formed on the orientation film 81B on the side of the incident liquid crystal surface S7 and a transmissive member 83 formed on the orientation film 81C on the side of the outputting liquid crystal surface S8.

The transmissive members 82 and 83 have the same configuration as those of the transmissive members 22 and 23, respectively. The transmissive member 82 has a light incident surface 82A and a light-outputting surface 82B. The transmissive member 83 also has a light-outputting surface 83A. In the present embodiment, the drive electrodes 84 are composed of an electrode 84A formed on the light incident surface 82A of the transmissive member 82 and a light-outputting surface 84B of the transmissive member 83. The drive circuit 40 applies a drive voltage between the electrodes 84A and 84B. The electrodes 84A and 84B are made of, for example, a transparent electrode such as an ITO film or a metal mesh.

The present embodiment corresponds to the case where the liquid crystal element 81 does not have an electrode, and the drive electrodes 84 are provided outside the liquid crystal element 81 as an external electrode spaced apart from the liquid crystal element 81. As shown in FIG. 17(b), in the present embodiment, the orientation films 81B and 81C are configured to rub the liquid crystal molecules MC6 in the liquid crystal layer 81A in the x-axis direction, that is, in a direction along the light incident surface 82A of the transmissive member 82 in the layer direction of the liquid crystal layer 81A.

Figure 18:
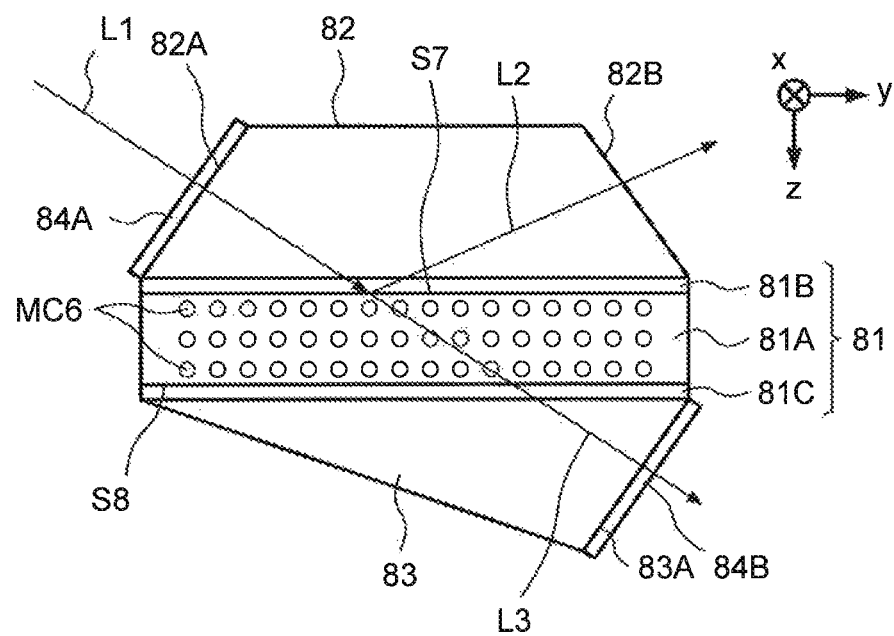
FIGS. 18(a) and 18(b) are views schematically showing the paths of light rays in the optical element according to the third embodiment.
Figure 18:
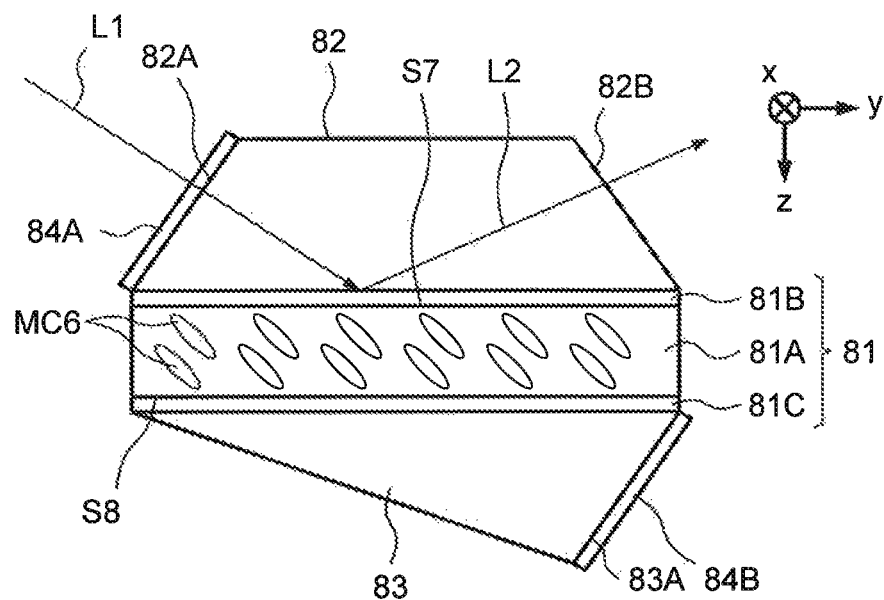

FIGS. 18(a) and 18(b) are views schematically showing the state of orientation of the liquid crystal molecules MC6 and the paths of light rays in the optical element 80 in a not-driven state and in a driven state in the optical element 81, respectively. As shown in FIG. 18(a), in a not-driven state, the liquid crystal molecules MC6 are oriented in the x-axis direction, that is, along a direction orthogonal to the incident direction of the incident light ray L1. This is the same state as that in a driven state (such as FIG. 5(a)) in the optical element 20.

Therefore, in the not-driven state of the optical element 80, a part of the incident light ray L1 incident from the light incident surface S7 of the transmissive member 82 is totally reflected from the incident liquid crystal surface S7, and another part thereof is transmitted through the liquid crystal element 81. Therefore, the totally reflected light is outputted from the light-outputting surface 82B of the transmissive member 82 as the reflected light ray L2 (that is, to be incident on the optical element 30). The light having been transmitted through the liquid crystal element 81 is outputted from the light-outputting surface 83A of the transmissive member 83 as a transmitted light ray L3 (that is, to be outputted by the output device 13).

On the other hand, as shown in FIG. 18(b), in a driven state of the optical element 80, the electrodes 84A and 84B generate an electric field along the opposite direction of the light incident surface 82A of the transmissive member 82 and the light-outputting surface 83A of the transmissive member 83. Therefore, the liquid crystal molecules MC6 have components in the y-axis direction and the z-axis direction, and are oriented in the inclined direction with respect to the incident liquid crystal surface S7. The orientation direction of the liquid crystal molecules MC6 is, for example, substantially the same as the incident direction of the incident light ray L1. In this state, all the incident light ray L1 is totally reflected from the incident liquid crystal surface S7 regardless of the polarized components. Therefore, all the incident light ray L1 is outputted from the light-outputting surface 82B of the transmissive member 82 as the reflected light ray L2.

In the present embodiment, the drive electrodes 84 can be formed of a film-like conductive film or the like. Therefore, the configuration of the drive electrodes 84 is simplified as compared to, for example, those in the first embodiment. In addition, the electric field applied to the liquid crystal layer 81A is stabilized as compared with the first embodiment and the like.

Figure 19:
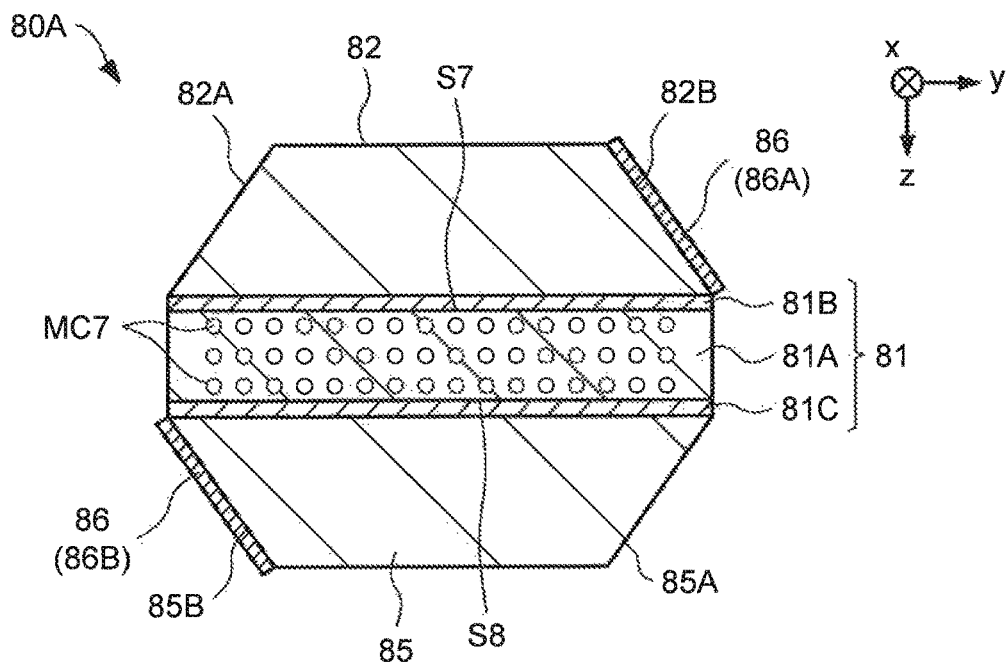
FIG. 19(a) is a schematic cross-sectional view of a liquid crystal element in the optical element according to a modification of the third embodiment.
FIG. 19(b) is a view schematically showing paths of light rays in the optical element according to the modification of the third embodiment.
Figure 19:
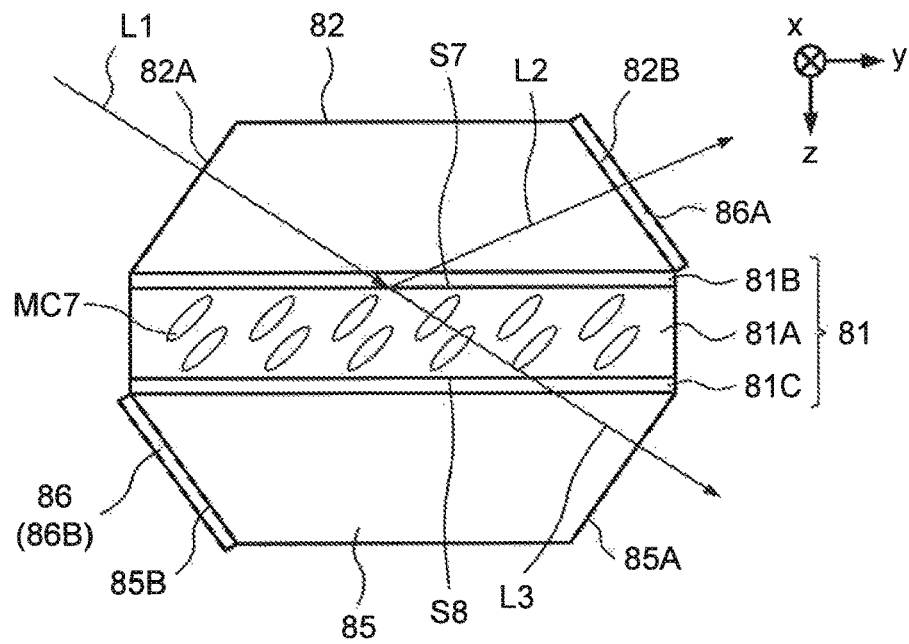

FIG. 19(a) is a schematic cross-sectional view of an optical element 80A according to a modification of the third embodiment. The optical element 80A has the same configuration as that of the optical element 80 except for the configuration of a transmissive member 85 and drive electrodes 86. The optical element 80A has the transmissive member 85 and the drive electrodes 86 instead of the transmissive member 83 and the drive electrodes 84 of the optical element 80, respectively.

The transmissive member 85 is formed on an orientation film 81C on the side of the outputting liquid crystal surface S8 of the liquid crystal element 81. In addition, the transmissive member 85 has an opposite surface 85B that faces the light-outputting surface 82B of the transmissive member 82. Specifically, in the present embodiment, the transmissive member 85 has the same shape as that of the transmissive member 82. The transmissive member 85 has a surface parallel to the light-outputting surface 82B of the transmissive member 82 as the opposite surface 85B.

In addition, the drive electrodes 86 are composed of an electrode 86A formed on the light-outputting surface 82B of the transmissive member 82 and an electrode 86B formed on the opposite surface 85B of the transmissive member 85. The drive circuit 40 applies a drive voltage between electrodes 86A and 86B. In the not-driven state, the liquid crystal molecules MC7 are in the same state of orientation as that in the liquid crystal molecule MC6.

FIG. 19(b) is a view schematically showing the state of orientation of the liquid crystal molecules MC7 and the paths of light rays in the optical element 80A in a driven state of the optical element 80A. In the present modification, the application of a voltage to the drive electrodes 86 generates an electric field in a direction substantially perpendicular to the incident light ray L1. Therefore, the liquid crystal molecules MC7 are oriented in the direction orthogonal to the incident light ray L1. In this state, the incident light ray L1 is separated into a reflected light ray L2 and a transmitted light ray L3. In the present modification, both of the reflected light ray L2 and the transmitted light ray L3 are extracted from the optical element 80A both in a driven state and in a not-driven state, as in the optical element 60, for example.

Thus, even when the drive electrodes are formed on the transmissive member 82, 83 or 85 to adjust the orientation direction of the liquid crystal molecules, it is possible to provide the optical element 60 and the optical device 51 that have high driving responsiveness, and enables the extraction of light with high efficiency.

The embodiments described above can be combined with one another. For example, it is possible to configure an optical device in which the optical element 51 is joined to the optical element 20 instead of the optical element 30.

In the embodiments described above, the incident light ray L1 can be easily separated by adjusting the state of orientation of the liquid crystal molecules MC by the orientation film and the drive electrodes, and output lights with a plurality of systems can be obtained with having high light utilization efficiency and high responsiveness.

REFERENCE SIGNS LIST 12, 12A, 12B, 12C, 51, 71 optical device
20, 20A, 20B, 20C, 30, 60, 80, 80A optical element
21A, 25A, 31A, 61A, 81A liquid crystal layer
21B, 21C, 25B, 25C, 31B, 31C, 61B, 61C, 81B, 81C orientation film
21D, 31D, 25D, 31D, 61D, 84, 86 drive electrode
22, 27, 23, 32, 33, 82, 83 transmissive member
S1, S11, S12. S3, S5, S7 incident liquid crystal surface (first liquid crystal surface)
S2, S21, S22, S4, S6, S8 outputting liquid crystal surface (second liquid crystal surface)

The invention claimed is:

1. An optical device comprising first and second optical elements, wherein
said first optical element has: a first liquid crystal element; a first transmissive member formed on said first liquid crystal element and having a light incident surface on which external incident light is incident and a first light-outputting surface through which light reflected by said first liquid crystal element is outputted; and a second transmissive member having a second light-outputting surface through which transmitted light having been transmitted through said first liquid crystal element is outputted;
said second optical element has: a second liquid crystal element; and a third transmissive member formed on said second liquid crystal element and joined to said first light-outputting surface;
said first liquid crystal element of said first optical element has a first liquid crystal layer containing liquid crystal molecules and having first and second liquid crystal surfaces opposite to each other, and
said light incident surface of said first transmissive member is inclined with respect to said first liquid crystal surface.

2. The optical device according to claim 1, wherein
said first liquid crystal element of said first optical element has:
a first orientation film that is formed on said first liquid crystal surface and configured to orient said liquid crystal molecules in a first direction in said first liquid crystal surface;
a second orientation film that is formed on said second liquid crystal surface and configured to orient said liquid crystal molecules in a second direction orthogonal to said first direction in said second liquid crystal surface; and
a first drive electrode that is formed on said first orientation film and configured to generate an electric field for orienting said liquid crystal molecules in said second direction by application of a voltage, and said first and second light transmissive members are formed on said first and second liquid crystal surfaces, respectively.

3. The optical device according to claim 2, wherein said second liquid crystal element of said second optical element has:
- a second liquid crystal layer containing liquid crystal molecules and having third and fourth liquid crystal surfaces opposite to each other;
- third and fourth orientation films formed on said third and fourth liquid crystal surfaces, respectively; and
- a second drive electrode configured to generate an electric field for orienting the liquid crystal molecules in an in-plane direction of said third liquid crystal surface by application of a voltage.

4. The optical device according to claim 2, wherein said first transmissive member has a refractive index larger than that of said liquid crystal layer with respect to a first polarized component having an electric field direction in said first direction among said incident light, and has a smaller refractive index than that of said liquid crystal layer with respect to a second polarized component having an electric field direction in said second direction.

5. The optical device according to claim 2, wherein said light incident surface of said first transmissive member and said second light-outputting surface of said second transmissive member are disposed in parallel with each other.

6. The optical device according to claim 1, comprising a beam splitter formed on said second light-outputting surface of the second transmissive member.

* * * * *